United States Patent
Vijjini et al.

(10) Patent No.: US 12,367,344 B2
(45) Date of Patent: Jul. 22, 2025

(54) CURRICULAR NEXT CONVERSATION PREDICTION PRETRAINING FOR TRANSCRIPT SEGMENTATION

(71) Applicant: Adobe Inc., San Jose, CA (US)

(72) Inventors: Anvesh Rao Vijjini, Chapel Hill, NC (US); Hanieh Deilamsalehy, Seattle, WA (US); Franck Dernoncourt, Seattle, WA (US)

(73) Assignee: Adobe Inc., San Jose, CA (US)

( * ) Notice: Subject to any disclaimer, the term of this patent is extended or adjusted under 35 U.S.C. 154(b) by 273 days.

(21) Appl. No.: 18/307,300

(22) Filed: Apr. 26, 2023

(65) Prior Publication Data
US 2024/0362413 A1   Oct. 31, 2024

(51) Int. Cl.
G06F 40/284   (2020.01)
G06F 40/30    (2020.01)
(Continued)

(52) U.S. Cl.
CPC ............ G06F 40/284 (2020.01); G06F 40/30 (2020.01); G06N 3/04 (2013.01); G06N 3/09 (2023.01)

(58) Field of Classification Search
CPC ........ G06F 16/65; G06F 40/27; G06F 40/284; G06F 40/30; G06F 40/166; G06F 40/174; G06F 40/274; G06F 40/279; G06F 40/289; G06F 40/295; G06F 40/35; G06F 40/40; G06N 3/04; G06N 3/044; G06N 3/045; G06N 3/006; G06N 3/08; G06N 3/09; G06N 20/00; G06N 7/01; G10L 25/48; G10L 25/63; H04L 51/52; H04L 51/02
(Continued)

(56) References Cited

U.S. PATENT DOCUMENTS 10,997,372 B2 *  5/2021  Gupta ................... G06F 40/216
11,211,050 B2 * 12/2021  Bastide ................ G10L 15/063
(Continued)

OTHER PUBLICATIONS

Alessandro Solbiati, Kevin Heffernan, Georgios Damaskinos, Shivani Poddar, Shubham Modi, and Jacques Cali. 2021. Unsupervised topic segmentation of meetings with bert embeddings. arXiv preprint arXiv:2106.12978.

(Continued)

*Primary Examiner* — Gerald Gauthier
(74) *Attorney, Agent, or Firm* — Keller Preece PLLC

(57) ABSTRACT

The present disclosure relates to systems, non-transitory computer-readable media, and methods for training and utilizing a transcript segmentation neural network to segment audio recording transcripts. In particular, in one or more embodiments, the disclosed systems implement a pretraining technique for a transcript segmentation neural network based on a specialized dataset that includes contextual information about stored sentences or conversations. For example, the discloses system train a transcript segmentation neural network based on contextual data that indicates semantic similarities and/or distances between sentences of a digital document. In some cases, the disclosed systems also (or alternatively) train a transcript segmentation neural network based on curricular data generated by a classification model. Moreover, in some cases, the disclosed system use the trained transcript segmentation neural network to generate a segmented audio transcript.

20 Claims, 12 Drawing Sheets

(51) Int. Cl.
G06N 3/04 (2023.01)
G06N 3/09 (2023.01)
(58) Field of Classification Search
USPC .................................................. 704/9; 706/14
See application file for complete search history.

(56) References Cited

U.S. PATENT DOCUMENTS

| | | | | |
|---|---|---|---|---|
| 11,263,663 | B2* | 3/2022 | Gruen | G06N 20/00 |
| 11,663,625 | B2* | 5/2023 | Gruen | G06N 20/00 704/9 |
| 11,675,979 | B2* | 6/2023 | Tsuji | H04L 51/52 704/9 |
| 11,790,251 | B1* | 10/2023 | Powers | G06F 40/279 706/14 |
| 11,836,161 | B2* | 12/2023 | Gupta | G06F 16/285 |
| 11,983,808 | B2* | 5/2024 | Tiwari | H04L 51/02 |
| 12,190,062 | B2* | 1/2025 | Roy | G06F 40/274 |
| 2016/0170971 | A1* | 6/2016 | McSherry | G06F 40/274 704/9 |
| 2016/0316059 | A1* | 10/2016 | Nuta | G06N 7/01 |
| 2020/0090648 | A1* | 3/2020 | Wambugu | G10L 25/48 |
| 2020/0175117 | A1* | 6/2020 | Tsuji | H04L 51/52 |
| 2020/0311204 | A1* | 10/2020 | Gupta | G06N 3/006 |
| 2021/0012374 | A1* | 1/2021 | Gruen | G06F 40/30 |
| 2021/0050002 | A1* | 2/2021 | Bastide | G06F 40/279 |
| 2021/0263952 | A1* | 8/2021 | Gupta | G06F 16/65 |
| 2023/0105453 | A1* | 4/2023 | Lavi | G06F 40/35 704/9 |
| 2024/0062108 | A1* | 2/2024 | Pham | G06F 40/295 |
| 2024/0070951 | A1* | 2/2024 | Tiwari | G06N 20/00 |
| 2024/0111960 | A1* | 4/2024 | Earle | G06F 40/35 |
| 2024/0126795 | A1* | 4/2024 | Zhong | H04L 51/02 |
| 2024/0143934 | A1* | 5/2024 | Zaremoodi | G06F 40/289 |
| 2024/0169152 | A1* | 5/2024 | Yannam | G06F 40/40 |
| 2024/0169993 | A1* | 5/2024 | Yannam | G06F 40/35 |
| 2024/0177729 | A1* | 5/2024 | Parida | G10L 25/63 |
| 2024/0233731 | A1* | 7/2024 | Smith | G06F 40/166 |
| 2024/0242021 | A1* | 7/2024 | Cobzarenco | G06F 40/174 |
| 2024/0320471 | A1* | 9/2024 | Chen | G06N 3/045 |
| 2024/0362413 | A1* | 10/2024 | Vijjini | G06N 3/045 |

OTHER PUBLICATIONS

Alexander Gruenstein, John Niekrasz, and Matthew Purver. 2008. Meeting structure annotation. In Recent Trends in Discourse and Dialogue, pp. 247-274. Springer.
Benfeng Xu, Licheng Zhang, Zhendong Mao, Quan Wang, Hongtao Xie, and Yongdong Zhang. 2020. Curriculum learning for natural language understanding. In Proceedings of the 58th Annual Meeting of the Association for Computational Linguistics, pp. 6095-6104.
Brian Midei and Marko Mandic. 2019. Neural text segmentation on podcast transcripts. github.com/bmmidei/SliceCast.
Cao Liu, Shizhu He, Kang Liu, Jun Zhao, et al. 2018. Curriculum learning for natural answer generation. In IJCAI, pp. 4223-4229.
Chengyi Wang, Yu Wu, Shujie Liu, Ming Zhou, and Zhenglu Yang. 2020. Curriculum pre-training for end-to-end speech translation. In Proceedings of the 58th Annual Meeting of the Association for Computational Linguistics, pp. 3728-3738.
Daniel Cer, Yinfei Yang, Sheng-yi Kong, Nan Hua, Nicole Limtiaco, Rhomni St John, Noah Constant, Mario Guajardo-Cespedes, Steve Yuan, Chris Tar, et al. 2018. Universal sentence encoder. arXiv preprint arXiv:1803.11175.
Doug Beeferman, Adam Berger, and John Lafferty. 1999. Statistical models for text segmentation. Machine learning, 34(1):177-210.
Elise Jing, Kristiana Schneck, Dennis Egan, and Scott A Waterman. 2021. Identifying introductions in pod- cast episodes from automatically generated transcripts. arXiv preprint arXiv:2110.07096.
Freddy YY Choi. 2000. Advances in domain independent linear text segmentation. In 1st Meeting of the North American Chapter of the Association for Computational Linguistics.

Goran Glava, Federico Nanni, and Simone Paolo Ponzetto. 2016. Unsupervised text segmentation using semantic relatedness graphs. In Proceedings of the Fifth Joint Conference on Lexical and Computational Semantics, pp. 125-130, Berlin, Germany. Association for Computational Linguistics.
Jacob Devlin, Ming-Wei Chang, Kenton Lee, and Kristina Toutanova. 2019. BERT: Pre-training of deep bidirectional transformers for language understanding. In Proceedings of the 2019 Conference of the North American Chapter of the Association for Computational Linguistics: Human Language Technologies, vol. 1 (Long and Short Papers), pp. 4171-4186, Minneapolis, Minnesota. Association for Computational Linguistics.
Jacob Eisenstein. 2009. Hierarchical text segmentation from multi-scale lexical cohesion. In Proceedings of Human Language Technologies: The 2009 Annual Conference of the North American Chapter of the Association for Computational Linguistics, pp. 353-361.
Jaime Arguello and Carolyn Rosé. 2006. Topic segmentation of dialogue. Analyzing Conversations in Text and Speech (ACTS), pp. 42-49.
Jason Wei and Kai Zou. 2019. EDA: Easy data augmentation techniques for boosting performance on text classification tasks. In Proceedings of the 2019 Conference on Empirical Methods in Natural Language Processing and the 9th International Joint Conference on Natural Language Processing (EMNLP-IJCNLP), pp. 6382-6388, Hong Kong, China. Association for Computational Linguistics.
Jing Li, Aixin Sun, and Shafiq R Joty. 2018. Segbot: A generic neural text segmentation model with pointer network. In IJCAI.
Jinxiong Xia, Cao Liu, Jiansong Chen, Yuchen Li, Fan Yang, Xunliang Cai, Guanglu Wan, and Houfeng Wang. 2022. Dialogue topic segmentation via parallel extraction network with neighbor smoothing. In Proceedings of the 45th International ACM SIGIR Conference on Research and Development in Information Retrieval, pp. 2126-2131.
Koichi Nagatsuka, Clifford Broni-Bediako, and Masayasu Atsumi. 2021. Pre-training a bert with curriculum learning by increasing block- size of input text. In Proceedings of the International Conference on Recent Advances in Natural Language Processing (RANLP 2021), pp. 989-996.
Lev Pevzner and Marti A Hearst. 2002. A critique and improvement of an evaluation metric for text segmentation. Computational Linguistics, 28(1):19- 36.
Linzi Xing and Giuseppe Carenini. 2021. Improving unsupervised dialogue topic segmentation with utterance-pair coherence scoring. In Proceedings of the 22nd Annual Meeting of the Special Interest Group on Discourse and Dialogue, pp. 167-177.
Marti A Hearst. 1997. Text tiling: Segmenting text into multi-paragraph subtopic passages. Computational linguistics, 23(1):33-64.
Masao Utiyama and Hitoshi Isahara. 2001. A statistical model for domain-independent text segmentation. In Proceedings of the 39th annual meeting of the Association for Computational Linguistics, pp. 499-506.
Michal Lukasik, Boris Dadachev, Kishore Papineni, and Gonçalo Simões. 2020. Text segmentation by cross segment attention. In Proceedings of the 2020 Conference on Empirical Methods in Natural Language Processing (EMNLP), pp. 4707-4716, Online. Association for Computational Linguistics.
Mrinmaya Sachan and Eric Xing. 2016. Easy questions first? a case study on curriculum learning for question answering. In Proceedings of the 54th Annual Meeting of the Association for Computational Linguistics (vol. 1: Long Papers), pp. 453-463.
Nils Reimers and Iryna Gurevych. 2019. Sentence- bert: Sentence embeddings using siamese bert- networks. In Proceedings of the 2019 Conference on Empirical Methods in Natural Language Processing and the 9th International Joint Conference on Natural Language Processing (EMNLP-IJCNLP), pp. 3982-3992.
Omri Koshorek and Adir Cohen. 2017. Learning text segmentation using deep lstm.
Omri Koshorek, Adir Cohen, Noam Mor, Michael Rot- man, and Jonathan Berant. 2018. Text segmentation as a supervised learning task. In Proceedings of the 2018 Conference of the North American

(56) References Cited

OTHER PUBLICATIONS

Chapter of the Association for Computational Linguistics: Human Language Technologies, vol. 2 (Short Papers), pp. 469-473.

Pei-Yun Hsueh, Johanna D Moore, and Steve Renals. 2006. Automatic segmentation of multiparty dialogue. In 11th Conference of the European Chapter of the Association for Computational Linguistics, pp. 273-280.

Pinkesh Badjatiya, Litton J Kurisinkel, Manish Gupta, and Vasudeva Varma. 2018. Attention-based neural text segmentation. In European Conference on Information Retrieval, pp. 180-193. Springer.

Ruqing Zhang, Jiafeng Guo, Yixing Fan, Yanyan Lan, and Xueqi Cheng. 2019. Outline generation: Understanding the inherent content structure of documents. In Proceedings of the 42nd International ACM SIGIR Conference on Research and Development in Information Retrieval, pp. 745-754.

Vijjini Anvesh Rao, Kaveri Anuranjana, and Radhika Mamidi. 2020. A sentiwordnet strategy for curriculum learning in sentiment analysis. In International Conference on Applications of Natural Language to Information Systems, pp. 170-178. Springer.

Volkan Cirik, Eduard Hovy, and Louis-Philippe Morency. 2016. Visualizing and understanding curriculum learning for long short-term memory networks. arXiv preprint arXiv:1611.06204.

Yoshua Bengio, Jérôme Louradour, Ronan Collobert, and Jason Weston. 2009. Curriculum learning. In Proceedings of the 26th annual international conference on machine learning, pp. 41-48.

\* cited by examiner

| s↓ d→ | 15 | 66 | 100 | 200 | 500 |
|---|---|---|---|---|---|
| 0.4 | 0.58 | 0.63 | 0.61 | 0.69 | 0.79 |
| 0.6 | 0.61 | 0.69 | 0.59 | 0.77 | 0.78 |
| 0.7 | 0.59 | 0.75 | 0.69 | 0.77 | 0.80 |
| 0.8 | 0.62 | 0.74 | 0.76 | 0.82 | 0.89 |
| 0.9 | 0.59 | 0.71 | 0.68 | 0.7 | 0.68 |

*Fig. 5A*

| s↓ d→ | 15 | 66 | 100 | 200 | 500 |
|---|---|---|---|---|---|
| 0.4 | 0.00 | 0.04 | 0.10 | 0.12 | 0.12 |
| 0.6 | 0.001 | 0.11 | 0.11 | 0.14 | 0.10 |
| 0.7 | 0.001 | 0.00 | 0.17 | 0.24 | 0.09 |
| 0.8 | 0.02 | 0.12 | 0.18 | 0.18 | 0.11 |
| 0.9 | 0.03 | 0.04 | 0.06 | 0 | 0.09 |

*Fig. 5B*

| Models | F1 (↑) | Pk (↓) | WDiff (↓) |
|---|---|---|---|
| S-BERT | 4.1 | 50.5 | 65.1 |
| CSB | 17.5 | 42.5 | 37.3 |
| Adv. NCP + CSB | 22.1*** | 37.2*** | 36.2** |
| Curr. NCP + CSB | 22.6* | 35.6*** | 37.5** |

Fig. 8

CURRICULAR NEXT CONVERSATION PREDICTION PRETRAINING FOR TRANSCRIPT SEGMENTATION

BACKGROUND

Recent years have seen significant improvements in systems that identify segment breaks in digital documents to organize continuous text into conceptually related segments. For example, some systems are able to segment well-organized digital documents that clearly transition through multiple topics by introducing breaks between semantically independent segments. Although conventional systems can segment well-organized digital documents, these systems have a number of technical deficiencies with regard to segmenting more difficult digital documents that have less clearly delineated transitions between topics, such as audio recording transcripts.

SUMMARY

Embodiments of the present disclosure provide benefits and/or solve one or more of the foregoing or other problems in the art with systems, non-transitory computer-readable media, and methods for training and utilizing a transcript segmentation neural network to segment audio recording transcripts into semantically independent segments. For example, the disclosed systems implement a pretraining technique for a transcript segmentation neural network based on a specialized dataset that includes contextual information about stored sentences or conversations. In some embodiments, the disclosed systems train a transcript segmentation neural network based on contextual data that indicates semantic similarities and/or distances between sentences of a digital document. In some cases, the disclosed systems also (or alternatively) train a transcript segmentation neural network based on curricular data generated by a classification model. Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 5A-5B illustrate example experimental results of a transcript segmentation neural network in accordance with one or more embodiments.

FIG. 8 illustrates an example table of experimental results comparing the transcript segmentation system with other systems in accordance with one or more embodiments.

DETAILED DESCRIPTION

Figure 1:
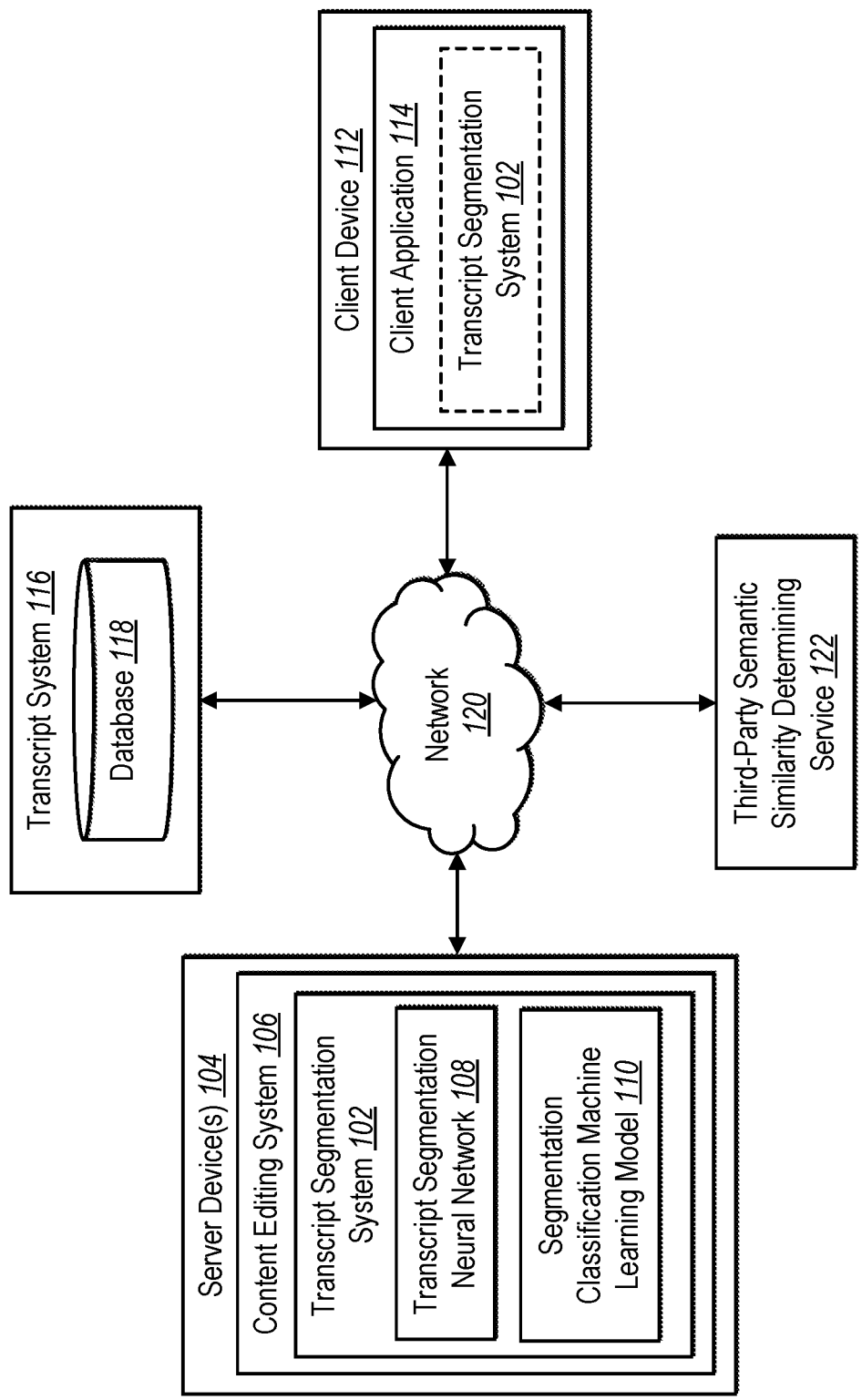
FIG. 1 illustrates an example system environment in which a transcript segmentation system operates in accordance with one or more embodiments.

This disclosure describes one or more embodiments of a transcript segmentation system that trains and utilizes a transcript segmentation neural network to accurately segment audio recording transcripts into semantically independent segments. In particular, in some embodiments, the transcript segmentation system extracts and compares contextual data, such as semantic similarity and distance, for sentences within an audio recording transcript and modifies parameters of a transcript segmentation neural network based on the contextual data. In some cases, the transcript segmentation system modifies parameters of the transcript segmentation neural network in a curricular manner by training first with conversation predictions associated with semantically dissimilar transcript contexts (e.g., "easy" from a segmentation perspective) and then on conversation predictions associated with semantically similar transcript contexts (e.g., "hard" from a segmentation perspective).

As just mentioned, in some embodiments, the transcript segmentation system utilizes a pretraining technique to learn parameters for a transcript segmentation neural network. As part of the pretraining process, in some cases, the transcript segmentation system generates or extracts contextual data from an audio recording transcript. For example, the transcript segmentation system extracts contextual data by determining, in a sentence-by-sentence fashion for an audio recording transcript, a first transcript context that occurs before (e.g., left of) a specific sentence component (e.g., a sentence end, as delineated by a particular character such as a period, a question mark, or an exclamation mark) and a second transcript content that occurs after (e.g., right of) the specific sentence component.

As also mentioned, in one or more embodiments, the transcript segmentation system generates a conversation prediction based on transcript contexts. For instance, the transcript segmentation system generates a conversation prediction that indicates that a sentence (e.g., the sentence associated with the transcript contexts) either belongs to the same conversation (or topic or segment) as a previous sentence or belongs to a new conversation (or topic or segment). In some embodiments, the transcript segmentation uses a technique called "advanced next conversation prediction" to compare transcript contexts by determining a distance between the transcript contexts and/or by determining a semantic similarity between the transcript contexts (e.g., via a semantic similarity model).

As also mentioned, in some embodiments, the transcript segmentation system determines curricular data in addition to contextual data for transcript contexts. For example, the transcript segmentation system determines, using a segmentation classification machine learning model, curricular data in the form of segmentation prediction labels to inform the pretraining of a transcript segmentation neural network for a downstream task (e.g., segmenting an audio recording transcript). In some cases, the transcript segmentation system utilizes a segmentation prediction label as a basis for generating a conversation prediction. Based on the conversation predictions generated from contextual data and/or curricular data, in some embodiments, the transcript segmentation system trains a transcript segmentation neural network by updating model parameters to improve conversation predictions for segmenting audio recording transcripts.

Indeed, in some embodiments, the transcript segmentation system uses the trained transcript segmentation neural network to generate a segmented audio recording transcript. For example, the transcript segmentation system can generate a plurality of transcript segments by classifying text segments according to whether the text segments are adjacent (e.g., belong to the same conversation or topic) or not. In some cases, the transcript segmentation system generates a segmented audio recording transcript from the plurality of transcript segments.

As suggested above, many conventional segmentation systems exhibit a number of shortcomings or disadvantages, particularly in flexibility and accuracy. For example, conventional segmentation systems are inflexible because they are unable to adapt the segmentation task for digital documents that are disorganized or un-curated. Conventional segmentation systems are often trained using text that is uniform and highly edited, such as Wikipedia articles or other published works, which follow conventional grammar and sentence structure rules, and which include clear transition words (or other delineators) that indicate changes in topic or conversation. Moreover, conventional segmentation systems are often limited to sentence-based segmentation breaks rather than segmentation breaks based on larger contexts of multiple sentences or paragraphs. However, unlike curated articles, audio recordings are often sporadic, with non-uniform flow and abrupt topic changes without transition words or phrases to indicate breaks in topics. As a result of their limited models, conventional segmentation systems cannot adapt the segmentation task to un-curated digital text and instead break down when segmenting audio recording transcripts.

Due at least in part to their inflexibility, some conventional segmentation systems are also inaccurate when segmenting audio recording transcripts. Many systems use automatic speech recognition to generate transcripts from audio recordings, which frequently introduce a multitude of errors and noise, such as insertions, deletions, replacements, and/or missing punctuation. As a result of the error-ridden, inconsistent nature of audio recording transcripts, conventional segmentation systems often struggle to accurately segment text from auto-generated audio recording transcripts, often producing errors such as segment breaks in the middle of semantically cohesive segments missing breaks between semantically independent segments.

As suggested above, embodiments of the transcript segmentation system provide certain improvements or advantages over conventional segmentation systems. For example, embodiments of the transcript segmentation system improve flexibility over other systems. To elaborate, unlike existing systems that break down when trying to segment digital text bodies that do not follow conventional grammar rules or include transitions to indicate segment breaks, the transcript segmentation system is able to flexibly adapt the segmentation task to digital text bodies that are non-uniform and unconventional, such as audio recording transcripts. Specifically, by analyzing similarities and distances for pairs of transcript contexts as a basis for making conversation predictions, the transcript segmentation system adapts network parameters to account for contextual data that allows for accurate segmentation even in disorganized texts. Indeed, by using longer contexts as input, the transcript segmentation system is able to learn information and make conversation predictions from a wide range of sentences varying in content, structure, and style.

Due at least in part to improving flexibility over prior systems, embodiments of the transcript segmentation system also improve accuracy over conventional segmentation systems. For example, while prior systems often generate inaccurate or erroneous segment breaks for audio recording transcripts (or other disorganized texts), the transcript segmentation system utilizes a pretraining process based on contextual data and/or curricular data to facilitate more accurate segmentation. Consequently, by determining distances and/or similarities between transcript contexts of a sentence, and by generating predicted semantic labels for pretraining samples, the transcript segmentation system learns parameters for a transcript segmentation neural network that more accurately determines segment breaks in audio recording transcripts than is achievable using prior systems.

Additional detail regarding the transcript segmentation system will now be provided with reference to the figures. For example, FIG. 1 illustrates a schematic diagram of an example system environment for implementing a transcript segmentation system 102 in accordance with one or more embodiments. An overview of the transcript segmentation system 102 is described in relation to FIG. 1. Thereafter, a more detailed description of the components and processes of the transcript segmentation system 102 is provided in relation to the subsequent figures.

As shown, the environment includes server device(s) 104, a client device 112, a transcript system 116, a network 120, and a third-party semantic similarity determining service 122. Each of the components of the environment communicate via the network 120, and the network 120 is any suitable network over which computing devices communicate. Example networks are discussed in more detail below in relation to FIG. 12.

As mentioned, the environment includes a client device 112. The client device 112 is one of a variety of computing devices, including a smartphone, a tablet, a smart television, a desktop computer, a laptop computer, a virtual reality device, an augmented reality device, or another computing device as described in relation to FIG. 12. Although FIG. 1 illustrates a single instance of the client device 112, in some embodiments, the environment includes multiple different recipient devices, each associated with a different user. The client device 112 communicates with the server device(s) 104 and/or the content editing system 106 via network 120. For example, the client device 112 receives audio recording transcripts from the transcript system 116 and provides information to server device(s) 104 indicating a request to produce a segmented audio recording transcript.

As shown in FIG. 1, the client device 112 includes a client application 114. In particular, the client application is a web application, a native application installed on the client device 112 (e.g., a mobile application or a desktop application), or a cloud-based application where all or part of the functionality is performed by the server device(s) 104. The client application 114 presents or displays information to a user, including information about transcripts and/or segmented transcripts.

As mentioned above, the environment includes a transcript system 116. In particular, the transcript system 116 generates, provides, and/or distributes audio recording transcripts to other systems, devices, or entities. For example, the transcript system 116 communicates with the server device(s) 104 and/or the client device 112 to provide audio recording transcripts in order to generate segmented audio transcripts (e.g., by the transcript segmentation system 102). In some cases, the transcript system 116 uses a database 118 to store or maintain audio recording transcripts for distribution to target entities.

As illustrated in FIG. 1, the environment also includes the third-party semantic similarity determining service 122. In particular, the third-party semantic similarity determining service 122 determines a semantic similarity between text. In some instances, the third-party semantic similarity determining service 122 communicates with the server device(s) 104 and/or the client device 112 to determine the semantic similarity between text (e.g., transcript contexts) for use in generating conversation predictions. For example, the third-party semantic similarity determining service 122 includes or utilizes a semantic meaning model (e.g., a neural network) to determine semantic meanings of sentences or transcript contexts.

Further, as illustrated in FIG. 1, the environment includes the server device(s) 104. The server device(s) 104 generates, tracks, stores, processes, receives, and transmits electronic data, such as digital audio recording transcript data. For example, the server device(s) 104 receives data from the client device 112 in the form of an indication of a client device request to generate a segmented audio transcript and/or a digital copy of the audio recording transcript for segmentation. In response, the server device(s) 104 receives data for training or updating a transcript segmentation neural network.

In some embodiments, the server device(s) 104 communicates with the client device 112 to transmit and/or receive data via the network 120. In some embodiments, the server device(s) 104 comprises a distributed server where the server device(s) 104 includes a number of server devices distributed across the network 120 and located in different physical locations. The server device(s) 104 comprise a content server, an application server, a communication server, a web-hosting server, a multidimensional server, or a machine learning server.

As further shown in FIG. 1, the server device(s) 104 also includes the transcript segmentation system 102 as part of a content editing system 106. For example, in one or more implementations, the content editing system 106 stores, generates, modifies, edits, enhances, provides, distributes, and/or shares digital content, such as digital images, segmented transcripts, emails, or digital videos. For example, the content editing system 106 provides digital content for editing or other forms of digital processing. In some implementations, the content editing system 106 provides digital content to particular digital profiles associated with client devices (e.g., the client device 112).

In one or more embodiments, the server device(s) 104 includes all, or a portion of, the transcript segmentation system 102. For example, the transcript segmentation system 102 operates on the server device(s) 104 to update a transcript segmentation neural network 108 and/or a segmentation classification machine learning model 110. In other embodiments, the client device 112 includes all or part of the transcript segmentation system 102. For example, the client device 112 generates, obtains (e.g., downloads), or uses one or more aspects of the transcript segmentation system 102, such as the transcript segmentation neural network 108 and/or the segmentation classification machine learning model from the server device(s) 104. Indeed, in some implementations, as illustrated in FIG. 1, the transcript segmentation system 102 is located in whole or in part of the client device 112. For example, the transcript segmentation system 102 includes a web hosting application that allows the client device 112 to interact with the server device(s) 104. To illustrate, in one or more implementations, the client device 112 accesses a web page supported and/or hosted by the server device(s) 104.

In one or more embodiments, the client device 112 and the server device(s) 104 work together to implement the transcript segmentation system 102. For example, in some embodiments, the server device(s) 104 train one or more neural networks discussed herein and provide the one or more neural networks to the client device 112 for implementation. In some embodiments, the server device(s) 104 trains one or more neural networks together with the client device 112.

Although FIG. 1 illustrates a particular arrangement of the environment, in some embodiments, the environment has a different arrangement of components and/or may have a different number or set of components altogether. For instance, as mentioned, the transcript segmentation system 102 is implemented by (e.g., located entirely or in part on) the client device 112. In addition, in one or more embodiments, the client device 112 communicates directly with the transcript segmentation system 102, bypassing the network 120.

Figure 2:
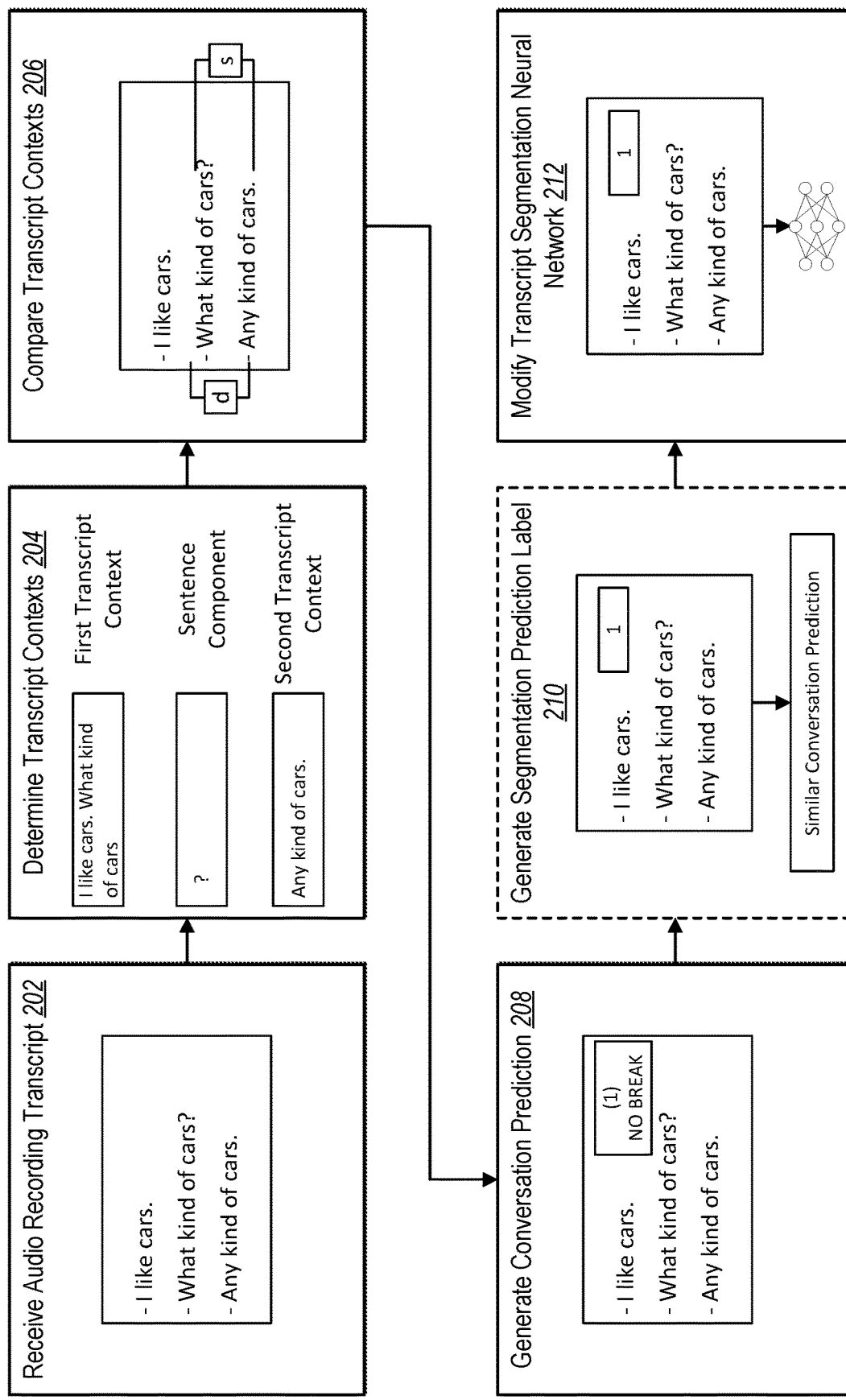
FIG. 2 illustrates an overview of a pretraining process for a transcript segmentation neural network in accordance with one or more embodiments.

As mentioned, in one or more embodiments, the transcript segmentation system 102 uses a pretraining technique for a transcript segmentation neural network that segments audio recording transcripts. In particular, the transcript segmentation system 102 compares pairs of transcript contexts to generate conversation predictions and uses the conversation predictions to modify parameters of the transcript segmentation neural network. FIG. 2 illustrates an overview diagram for training a transcript segmentation neural network in accordance with one or more embodiments. Additional detail regarding the various acts or components described in relation to FIG. 2 is provided thereafter with reference to subsequent figures.

As illustrated in FIG. 2, the transcript segmentation system 102 performs an act 202 to receive an audio recording transcript. In one or more embodiments, an audio recording transcript includes a digital document of unstructured text transcribed from verbal speech or dialogue of an audio recording. For example, transcript segmentation system 102 generates (or causes to be generated) the audio recording transcript using an automatic speech recognition software that transcribes verbal recordings into digital text. In another example, a transcription service generates the audio recording transcript through transcription (e.g., a human listening and typing up the audio). To illustrate, the transcript segmentation system 102 generates the audio recording transcript from an audio recording or an audio channel of a video recording, such as a podcast recording, a digital video, a virtual meeting, a digital music file, a recording of legal proceedings, a recording of medical procedures, a recorded journalism report, etc.

In some embodiments, the transcript segmentation system 102 receives the audio recording transcript from a client device (e.g., client device 112). In other embodiments, the transcript segmentation system 102 receives the audio recording transcript from a transcript system (e.g., transcript system 116) that generates audio recording transcripts from various audio recordings. As shown, the transcript segmentation system 102 receives an audio recording transcript of a podcast.

As illustrated in FIG. 2, the transcript segmentation system 102 performs an act 204 to determine transcript contexts. In some embodiments, the transcript segmentation system 102 determines a pair of transcript contexts for a sentence component. For example, the transcript segmentation system 102 determines transcript contexts by determining a set of text or characters surrounding (e.g., on either side of) a sentence component (e.g., a sentence end). In one or more embodiments, a transcript context includes portions of a transcript that are adjacent to the sentence component. To illustrate, a transcript context comprises a set number of words or phrases that are on either side of the sentence component. In some implementations, the transcript segmentation system 102 determines a transcript context by determining a number of words or phrases on a certain side of the sentence component (e.g., the right or left of the sentence component). In other instances, the transcript segmentation system 102 determines a first set of sentence tokens (e.g., characters and spaces) left of the sentence component and a second set of sentence tokens right of the sentence component, where the first set of sentence tokens and the second set of sentence tokens have an equal number of sentence tokens T.

As previously mentioned, the transcript segmentation system 102 determines a first transcript context and a second transcript context associated with a sentence component. In one or more embodiments, a sentence component includes a portion of a given sentence in an audio recording transcript. For example, a sentence component is a defined portion of a sentence from which a selection of words on either side can be measured. To illustrate, a sentence component includes the end of a sentence, as delineated or indicated by a particular character or token, such as a period, an exclamation mark, or a question mark. As another example, a sentence component includes the beginning of a sentence. As a further example, a sentence component includes the middle of a sentence or a marker in the middle of a sentence, such as a comma. As shown, the transcript segmentation system 102 determines a first transcript context including "I like cars. What kind of cars?," a sentence component "?," and a second transcript context "Any kind of cars."

As illustrated in FIG. 2, the transcript segmentation system 102 performs an act 206 and compares transcript context. In some embodiments, the transcript segmentation system 102 compares transcript context by determining a similarity between two or more transcript contexts. In particular, the transcript segmentation system 102 determines a semantic similarity between a first transcript context and a second transcript context surrounding a sentence component. For example, the transcript segmentation system 102 utilizes a semantic meaning model to determine semantic meanings for the first and second transcript contexts. In addition, the transcript segmentation system 102 utilizes a semantic similarity function to determine a semantic similarity by comparing the semantic meanings (e.g., by comparing, or determining distances between, semantic meaning vectors in a vector space). In some cases, determining a semantic similarity includes using a third-party system (e.g., the third-party semantic similarity determining service 122) to determine the semantic similarity metric.

In these or other embodiments, the transcript segmentation system 102 compares transcript contexts by determining a distance between transcript contexts. In particular, the transcript segmentation system 102 determines distance by determining a number of sentences between a first transcript context and a second transcript context. For example, determining a distance includes determining a metric that represents the number of sentences between the first transcript context and the second transcript context. In another example, determining a distance includes determining a metric that represents the number of characters between the first transcript context and the second transcript context. In a further example, determining a distance includes determining a metric that represents the number of tokens between the first transcript context and the second transcript context.

As also illustrated, the transcript segmentation system 102 performs an act 208 to generate a conversation prediction. In particular, the transcript segmentation system 102 generates a conversation prediction that indicates whether two transcript contexts (on either end of a sentence component) are adjacent. In one or more embodiments, a conversation prediction refers to a metric or a determination that indicates that two transcript contexts are adjacent or non-adjacent. For example, if a conversation prediction indicates that the transcript contexts are adjacent, then the transcript segmentation system 102 determines that transcript contexts are part of the same conversation (e.g., there should not be a segment break). Conversely, if a conversation prediction indicates that the transcript contexts are not adjacent, then the transcript segmentation system 102 determines that transcript contexts are not part of the same conversation (e.g., there should be a segment break). In some embodiments, a conversation prediction is a (binary) classifier, such as a "0" or a "1," where 0 indicates the transcript contexts are not adjacent and 1 indicates that the transcripts are adjacent. In other embodiments, a conversation prediction comprises a score (e.g., a number, a fraction, or other numerical indicator) indicating a degree or likelihood that the transcript contexts are adjacent. As illustrated, the transcript segmentation system 102 generates a conversation prediction of 1, indicating the transcript contexts are adjacent (e.g., there should not be a segment break).

As further illustrated in FIG. 2, in some embodiments, the transcript segmentation system 102 performs an act 210 and generates a segmentation prediction label. In particular, the transcript segmentation system 102 introduces curricular data by using a segmentation classification machine learning model to generate a segmentation prediction label for the sentence component. In one or more embodiments, a machine learning model refers to a computer algorithm or a collection of computer algorithms that automatically improve for a particular task through experience based on use of data. For example, a machine learning model uses one or more learning techniques to improve in accuracy and/or effectiveness. Example machine learning models include various types of neural networks, decision trees, support vector machines, and Bayesian networks.

As mentioned, the transcript segmentation system 102 uses a segmentation classification machine learning model to generate a segmentation prediction label. In one or more embodiments, a segmentation classification machine learning model refers to a machine learning model trained (on contextual data described herein) and used to classify or identify segmentation predictions (e.g., predictions on whether two text segments are adjacent). For example, the segmentation classification machine learning model generates a segmentation prediction label for a sentence component. To illustrate, the segmentation classification machine learning model can generate a segmentation prediction label that identifies whether transcript contexts are adjacent.

In some instances, the segmentation classification machine learning model is a neural network. In one or more embodiments, a neural network refers to a machine learning model that is trainable and/or tunable based on inputs to determine classifications or approximate unknown functions. For example, a neural network includes a model of interconnected artificial neurons (e.g., organized in layers) that communicate and learn to approximate complex functions and generate outputs (e.g., segmentation prediction labels) based on a plurality of inputs provided to the neural network. In some cases, a neural network refers to an algorithm (or set of algorithms) that implements deep learning techniques to model high-level abstractions in data. For example, a neural network includes, in one or more implementations, a convolutional neural network, a recurrent neural network (e.g., an LSTM), a graph neural network, or a generative adversarial neural network.

As mentioned, the transcript segmentation system 102 uses the segmentation classification machine learning model to generate a segmentation prediction label. In some embodiments, a segmentation prediction label refers to a label that classifies or defines a sentence component. For example, a segmentation classification machine learning model can generate a segmentation prediction label that identifies whether transcript contexts are adjacent (e.g., whether or not there should be a segmentation break). To illustrate, the segmentation prediction label is a classifier, such as a "0" or a "1" or a "yes" or "no." In other embodiments, a segmentation prediction label comprises a score (e.g., a number, a fraction, or other numerical indicators) indicating a degree to which a segmentation classification machine learning model predicts that the transcript contexts are adjacent.

In one or more embodiments, the transcript segmentation system 102 uses the segmentation prediction label to modify a transcript segmentation neural network. In particular, the transcript segmentation system 102 compares the segmentation prediction label to the conversation prediction and determines whether or not the segmentation prediction label matches the conversation prediction. In addition, in some embodiments, the transcript segmentation system 102 classifies conversation predictions according to whether or not the segmentation prediction label matches the conversation prediction and uses the classified conversation predictions to train the transcript segmentation neural network in a curricular manner. For example, the transcript segmentation system 102 classifies conversation predictions that do not match the segmentation prediction label as dissimilar conversation predictions and trains the transcript segmentation neural network with them first (e.g., trains with "easy" samples first). Further, the transcript segmentation system 102 classifies conversation predictions that match the segmentation prediction label as similar conversation predictions and trains the transcript segmentation neural network with them second (e.g., trains with "hard" samples second). As shown, the transcript segmentation neural network generates a segmentation prediction label of 0 and classifies the conversation prediction (e.g., the conversation prediction from act 208) as a similar conversation prediction.

As further illustrated in FIG. 2, the transcript segmentation system 102 performs an act 212 and modifies a transcript segmentation neural network. In one or more embodiments, a transcript segmentation neural network includes a neural network that is trained, tuned, or modified to segment transcripts into semantically independent segments. For example, the transcript segmentation neural network is a neural network trained or tuned to segment transcripts. In one or more embodiments, the transcript segmentation neural network is a Bidirectional Encoder Representations from Transformers ("BERT"). In certain instances, the transcript segmentation neural network is a cross-segment BERT model as described in M. Lukasik, B. Dadachev, K. Papineni, and G. Simones in Text Segmentation by cross segment attention, Proceedings of the 2020 Conference on Empirical Methods in Natural Language Processing (EMNLP). 4707-4716 (2020), which is incorporated herein by reference in its entirety.

As mentioned, the transcript segmentation system 102 modifies a transcript segmentation neural network. In particular, the transcript segmentation system 102 uses a conversation prediction and/or a segmentation prediction label to modify parameters of a transcript segmentation neural network. For example, the transcript segmentation system 102 can use the conversation prediction to modify weights and biases of the transcript segmentation neural network based on one or more loss functions indicating whether (and to what degree) the conversation prediction indicates that the transcript contexts are adjacent or not. As shown, the transcript segmentation system 102 uses the conversation prediction to modify the transcript segmentation neural network.

Figure 3:
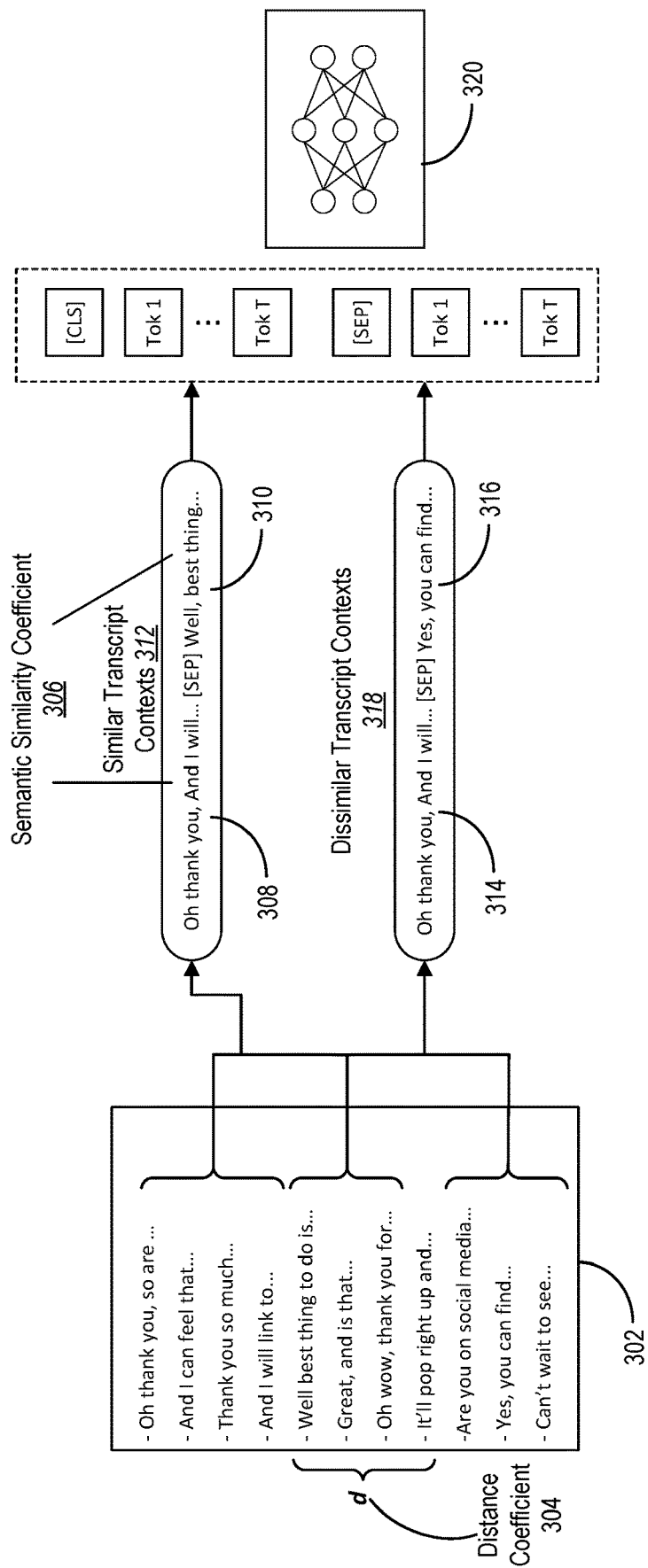
FIG. 3 illustrates an example diagram for comparing transcript context to generate a conversation prediction in accordance with one or more embodiments.

As mentioned above, in certain embodiments, the transcript segmentation system 102 compares transcript contexts to generate a conversation prediction. In particular, the transcript segmentation system 102 identifies transcript contexts from an audio recording transcript and compares a similarity and/or a distance between the transcript contexts to generate a conversation prediction. FIG. 3 illustrates an example diagram for comparing transcript contexts to generate a conversation prediction in accordance with one or more embodiments.

As illustrated in FIG. 3, the transcript segmentation system 102 receives an audio recording transcript 302, from which the transcript segmentation system 102 determines transcript contexts. In some embodiments, the transcript segmentation system 102 determines the transcript contexts from characters or tokens that occur within the audio recording transcript 302 on either end of a sentence component. For example, the transcript segmentation system 102 determines a left transcript context to include a number of tokens to the left of a sentence end and determines a right transcript context to include a number of tokens to the right of the sentence end.

In other embodiments, transcript segmentation system 102 determines a transcript context by determining sentence tokens associated with the transcript context. In particular, the transcript segmentation system 102 determines a number of tokens, such as characters and spaces, in a direction (e.g., left or right) from a sentence end. In some cases, the transcript segmentation system 102 determines tokens by determining a number of words in a direction (e.g., left or right) from a sentence end. For example, the transcript segmentation system 102 can determine a first set of sentence tokens to the left of a sentence end and a second set of sentence tokens right of the sentence end, where the first set of sentence tokens and the second set of sentence tokens are equal in number (e.g., T tokens).

As mentioned above, the transcript segmentation system 102 compares transcript contexts to determine a conversation prediction. In some embodiments, the transcript segmentation system 102 determines a conversation prediction using a (binary) classifier that indicates whether the transcript contexts are adjacent or not. For example, based on comparing the transcript contexts, the transcript segmentation system 102 determines a conversation prediction as a "0" or a "1," where 0 indicates the transcript contexts are not adjacent and 1 indicates that the transcripts are adjacent.

In one or more embodiments, the transcript segmentation system 102 compares transcript contexts by determining a distance between a pair of transcript contexts in the audio recording transcript. For example, the transcript segmentation system 102 determines the distance by determining a number of sentences (or a number of tokens) between a pair of transcript contexts. To illustrate, the transcript segmentation system 102 determines a distance coefficient 304 using the function Dist (l, r)=d, where the distance (d) is the number of sentences between a left transcript context (l) and a right transcript context (r).

In other embodiments, the transcript segmentation system 102 compares transcript contexts by determining a similarity between a pair of transcript contexts. In particular, the transcript segmentation system 102 determines a semantic similarity between a pair of transcript contexts in the audio recording transcript. In some cases, the transcript segmentation system 102 determines a similarity by determining a semantic similarity coefficient 306 that represents the semantic similarity between a pair of transcript contexts. For example, transcript context pairs with a semantic similarity will have a semantic similarity coefficient greater than 0.

In certain embodiments, the transcript segmentation system 102 determines the semantic similarity coefficient 306 through a semantic similarity function Sim (l, r)≥s, where Sim (l, r) is a similarity function that quantifies the similarity (s) between a left transcript context (l) and a right transcript context (r). For example, the transcript segmentation system 102 determines the similarity function by determining a distance in vector space representing the right transcript context and the left contexts, where the system generates the vectors in vector space using a semantic meaning model.

In some embodiments, as described, the transcript segmentation system 102 determines the semantic similarity coefficient 306. In other embodiments, the transcript segmentation system 102 uses a third-party semantic similarity determining service to determine the semantic similarity coefficient 306. For example, the third-party semantic similarity determining service can determine a semantic similarity metric that numerically represents the semantic similarity between two transcript contexts. In some cases, the transcript segmentation system 102 uses the semantic similarity metric as the semantic similarity coefficient 306. In other cases, the transcript segmentation system 102 uses the semantic similarity metric to determine the semantic similarity coefficient 306.

As illustrated in FIG. 3, in some embodiments, the transcript segmentation system 102 uses the semantic similarity coefficient 306 to identify transcript contexts as similar transcript contexts 312. For example, the transcript segmentation system 102 compares a transcript context 308 (e.g., a left transcript context) and a transcript context 310 (e.g., a right transcript context) to determine a similarity coefficient s and, based on s, identifies transcript context 308 and transcript context 310 as similar transcript contexts 312. Conversely, in some embodiments, the transcript segmentation system 102 uses the semantic similarity coefficient 306 to identify transcript contexts as dissimilar transcript contexts 318. For example, the transcript segmentation system 102 identifies that a transcript context 314 and a transcript context 316 are dissimilar transcript contexts 318 based on the semantic similarity coefficient 306.

In one or more embodiments, the transcript segmentation system 102 identifies transcript contexts as similar transcript contexts or dissimilar transcript contexts based on the semantic similarity coefficient satisfying a semantic similarity threshold. In particular, for the semantic similarity function Sim (l, r)≥s, if the semantic similarity coefficient(s) satisfies a semantic similarity threshold, the transcript segmentation system 102 identifies the transcript contexts as similar transcript contexts. In some cases, the transcript segmentation system 102 uses a binary classification to identify transcript contexts. For example, if the semantic similarity coefficient does not satisfy the semantic similarity threshold, the transcript segmentation system 102 generates a "0" and classifies the transcript contexts as dissimilar transcript contexts. If the semantic similarity coefficient satisfies the semantic similarity threshold, the transcript segmentation system 102 generates a "1" and classifies the transcript contexts as similar transcript contexts.

As previously mentioned, the transcript segmentation system 102 compares transcript contexts to generate a conversation prediction. As illustrated in FIG. 3, the transcript segmentation system 102 provides the transcript contexts to a transcript segmentation neural network 320 to generate a conversation prediction.

To elaborate, the transcript segmentation system 102 uses the transcript segmentation neural network 320 to determine a conversation prediction denoting whether two transcript contexts are adjacent. Specifically, the transcript segmentation system 102 inputs transcript contexts (e.g., l and r) of T tokens each that are associated with a sentence component (e.g., a sentence end) into the transcript segmentation neural network 320. If the transcript contexts are adjacent, the transcript segmentation neural network 320 outputs a 1, which denotes the transcript contexts belong to the same segment. If the transcript contexts are not adjacent, the transcript segmentation neural network 320 outputs a 0, denoting that the transcript contexts do not belong to the same segment (e.g., there should be a segmentation break).

Figure 4:
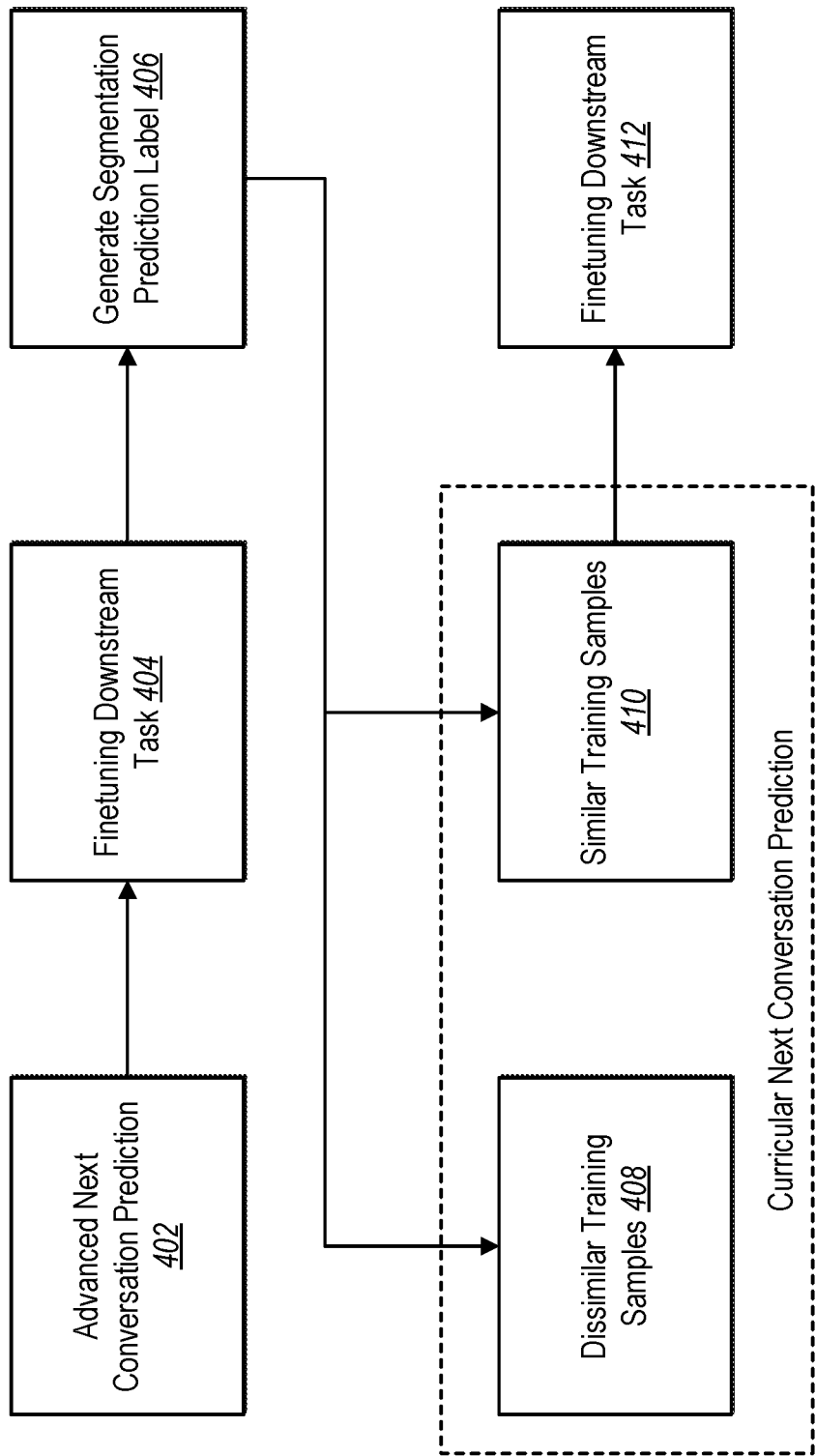
FIG. 4 illustrates an example process for curricular pretraining of a transcript segmentation neural network in accordance with one or more embodiments.

As previously mentioned, the transcript segmentation system 102 uses conversation predictions to train a transcript segmentation neural network. For example, in some cases, the transcript segmentation system 102 uses conversation predictions to train the transcript segmentation neural network using a curriculum learning approach. FIG. 4 illustrates an example curriculum training process for a transcript segmentation neural network in accordance with one or more embodiments.

As illustrated in FIG. 4, the transcript segmentation system 102 performs an act 402 and performs advanced next conversation prediction. In some embodiments, the transcript segmentation system 102 performs advanced next conversation prediction by determining transcript contexts and comparing the transcript contexts to determine a conversation prediction. In particular, the transcript segmentation system 102 performs advanced next conversation prediction by comparing the transcript contexts to determine a distance and/or a similarity, as described above with respect to FIG. 3.

In one or more embodiments, the transcript segmentation system 102 performs curriculum training for a transcript segmentation neural network by controlling the difficulty of training samples. In particular, the transcript segmentation system 102 controls the difficulty of training samples fed to a transcript segmentation neural network by dividing training samples into two sets as described above with respect to FIG. 3.

As also illustrated in FIG. 4, the transcript segmentation system 102 performs an act 404 for finetuning a downstream task. In some embodiments, the transcript segmentation system 102 fine tunes for a downstream task by comparing conversation predictions to labeled audio recording transcripts. For example, in one or more embodiments, the labeled audio recording transcripts include audio recording transcripts as described in B. Midei and M. Mandic in Neural Text Segmentation on Podcast Transcripts, githup-.com/bmmidei/Slicecast, (2019), which is incorporated herein by reference in its entirety. In one or more embodiments, the transcript segmentation system 102 compares conversation predictions to labeled audio recording transcripts using a loss function. In particular, the transcript segmentation system 102 uses a loss function such as a mean square error loss function or a cross-entropy loss function (or some other loss function based on the architecture of the transcript segmentation neural network) to determine a measure of loss between the conversation predictions and the labeled audio recording transcripts.

In some embodiments, the transcript segmentation system 102 adjusts or modifies parameters of the transcript segmentation neural network based on comparing the training samples and the labeled audio recording transcripts (e.g., to reduce a measure of loss). For example, the transcript segmentation system back propagates to modify internal parameters of the transcript segmentation neural network, such as weights and biases corresponding to internal layers and neurons of the model. By modifying the parameters, the transcript segmentation system 102 adjusts how the transcript segmentation neural network processes and passes information to reduce a measure of loss for subsequent iterations.

As further illustrated in FIG. 4, the transcript segmentation system 102 performs an act 406 and generates a segmentation prediction label. In one or more embodiments, the transcript segmentation system 102 uses a segmentation classification machine learning model to generate a segmentation prediction label. For example, the segmentation classification machine learning model is a classification machine learning model trained or used to classify or identify segmentation prediction labels. In some cases, the segmentation classification machine learning model is trained using the same audio recording transcripts as used for advanced next conversation prediction. In some embodiments, the transcript segmentation system 102 utilizes a segmentation classification machine learning model trained on positive and negative samples determined based on the contextual comparisons of contextual data, as described herein (e.g., for advanced next conversation prediction).

As previously mentioned, in one or more embodiments, the transcript segmentation system 102 uses a segmentation classification machine learning model to generate a segmentation prediction label for a sentence component. In particular, the segmentation classification machine learning model uses binary classification to generate a label denoting if there should be a segmentation break at the sentence component. For example, the segmentation classification machine learning model can generate a segmentation prediction label by outputting a "1" or a "no" if the sentence component should not denote a segmentation break (e.g., the surrounding transcript contexts are in the same segment) and a "0" or a "yes" if the sentence component should denote a segmentation break.

In some embodiments, the transcript segmentation system 102 uses the segmentation prediction label to identify conversation predictions as similar or dissimilar. In particular, the transcript segmentation system 102 compares the segmentation prediction label for a given sentence component to a conversation prediction associated with the sentence component. For example, if the segmentation classification machine learning model generates a segmentation prediction label for a training sample (e.g., a set of sentences including a sentence component and/or transcript contexts) that does not match a conversation prediction (e.g., where the segmentation prediction label is 1 and the conversation prediction is 0), the transcript segmentation system 102 identifies the conversation prediction as a dissimilar training sample. In a further example, if the segmentation classification machine learning model generates a segmentation prediction label that matches a conversation prediction, the transcript segmentation system 102 identifies the conversation as a similar training sample.

As further illustrated in FIG. 4, the transcript segmentation system 102 performs curricular next conversation prediction. In particular, the transcript segmentation system 102 performs curriculum next conversation prediction by first presenting dissimilar (or "easy") training samples, modifying the parameters of the transcript segmentation neural network, presenting similar (or "difficult") training samples, and modifying the parameters of the transcript segmentation neural network again. Indeed, dissimilar training samples are easier from a segmentation perspective (e.g., easier to distinguish a difference, so easier to break into segments), while similar training samples are harder from a segmentation perspective (e.g., harder to distinguish a difference, so harder to break into segments) and presenting the training samples in order of increasing difficulty provides a smoother transition between training samples that are semantically similar but different.

In one or more embodiments, the transcript segmentation system 102 generates datasets for curriculum next conversation prediction by dividing training samples according to their segmentation prediction label. For example, as illustrated in FIG. 4, the transcript segmentation system 102 performs an act 408 and groups training samples identified as dissimilar training samples together and performs an act 410 and groups training samples identified as similar training samples together. Indeed, by grouping together training samples according to their segmentation prediction label, the transcript segmentation system 102 groups together training samples according to their relative difficulty relating to segmentation and thereby generating a dataset for use in curricular next conversation prediction.

In some embodiments, the transcript segmentation system 102 controls the relative difficulty when grouping similar training samples and dissimilar training samples. In particular, the transcript segmentation system 102 controls the relative difficulty using the semantic similarity coefficient(s) and/or the distance coefficient (d). For example, a greater distance coefficient between the contexts makes the training sample easier (e.g., it is more likely that there is a segment break between transcript contexts that are further apart). However, decreasing the distance coefficient between the transcript contexts makes the training sample more difficult, though potentially more useful. Similarly, for example, training samples that have a high semantic similarity coefficient (e.g., are highly semantically similar) will be easy for the transcript segmentation system 102 to identify. However, increasing the semantic similarity coefficient will potentially filter out too many training samples, resulting in too few conversation predictions (e.g., not enough segment breaks). To control the relative difficulty, in one or more embodiments, the transcript segmentation system 102 uses Sim (l, r)≥s for training samples where the transcript contexts are adjacent (e.g., the transcript segmentation neural network 320 output a 1) and a distance Dist (l, r)=d for samples that are not adjacent (e.g., the transcript segmentation neural network output a 0).

As additionally illustrated in FIG. 4, the transcript segmentation system 102 performs an act 412 and finetunes a downstream task. In some embodiments, the transcript segmentation system 102 performs finetuning downstream by comparing the training samples to labeled audio recording transcripts, such as the audio recording transcripts described in relation to the act 404 for finetuning a downstream task. In some cases, the transcript segmentation system 102 compares the training samples and the labeled audio recording transcripts using a loss function. For example, the transcript segmentation system 102 uses a mean square error loss function or a cross-entropy loss function (or some other loss function based on the architecture of the transcript segmentation neural network) to determine a measure of loss between the conversation predictions and the labeled audio recording transcripts.

In some embodiments, the transcript segmentation system 102 adjusts or modifies parameters of the transcript segmentation neural network based on comparing the training samples to the labeled audio recording transcripts (e.g., to reduce a measure of loss). For example, the transcript segmentation system back propagates to modify internal parameters of the transcript segmentation neural network, such as weights and biases corresponding to internal layers and neurons of the model. By modifying the parameters, the transcript segmentation system 102 adjusts how the transcript segmentation neural network processes and passes information to reduce a measure of loss for subsequent iterations.

In one or more embodiments, the transcript segmentation system 102 adjusts the performance of the transcript segmentation neural network by adjusting the similarity and distance when determining conversation predictions. FIGS. 5A and 5B illustrate example experimental results for adjusting the performance of a transcript segmentation neural network in accordance with one or more embodiments.

In some embodiments, the transcript segmentation system 102 adjusts the performance of the transcript segmentation neural network by adjusting the semantic similarity coefficient(s) and the distance coefficient (d). In particular, the transcript segmentation system 102 adjusts the semantic similarity coefficient(s) and the distance coefficient (d) for the conversation predictions of the transcript segmentation neural network to determine the accuracy of the transcript segmentation neural network. For example, FIG. 5A illustrates the accuracy of the transcript segmentation neural network for advanced conversation prediction in accordance with one or more embodiments. In particular, FIG. 5A depicts how accuracy changes with respect to F1 scores across various similarity coefficients s and distance coefficients d. In some embodiments, F1 scores are calculated by using the model to make a conversation prediction and then comparing the conversation predictions to ground truth labeled audio recording transcripts. Indeed, an F1 score is a strict measure, as it rewards the transcript segmentation neural network only if the conversation predictions and the ground truth labeled audio recording transcripts exactly align.

As depicted in FIG. 5A, for example, accuracy for the transcript segmentation neural network increases as the similarity coefficient s and distance coefficient d increase. However, in some cases, increasing the similarity coefficient s also results in a decrease in performance as the transcript segmentation neural network filters out too many adjacent conversation predictions, and the size of the overall dataset increases.

FIG. 5B illustrates F1 scores denoting the performance of the tuned transcript segmentation neural network in segmenting audio recording transcripts. In particular, FIG. 5B illustrates changes in F1 score for the tuned transcript segmentation neural network (e.g., after the act 412) segmenting audio recording transcripts when the transcript segmentation system 102 uses various similarity coefficients s and distance coefficients d during advanced conversation prediction. For example, as illustrated in FIG. 5B, when the transcript segmentation system 102 increases the semantic similarity coefficient(s) and the distance coefficient (d), the accuracy increases.

Additionally, for example, comparing the advanced next conversation prediction results as illustrated in FIG. 5A with the results for the tuned transcript segmentation neural network as illustrated in FIG. 5B shows that low performance on advanced conversation prediction corresponds to a low performance by the tuned transcript segmentation neural network. However, as the semantic similarity coefficient(s) and the distance coefficient (d) increase, particularly the distance coefficient (d), advanced conversation prediction is too distinct from segmenting audio recording transcripts with the tuned transcript segmentation neural network leading to low efficacy.

Figure 6:
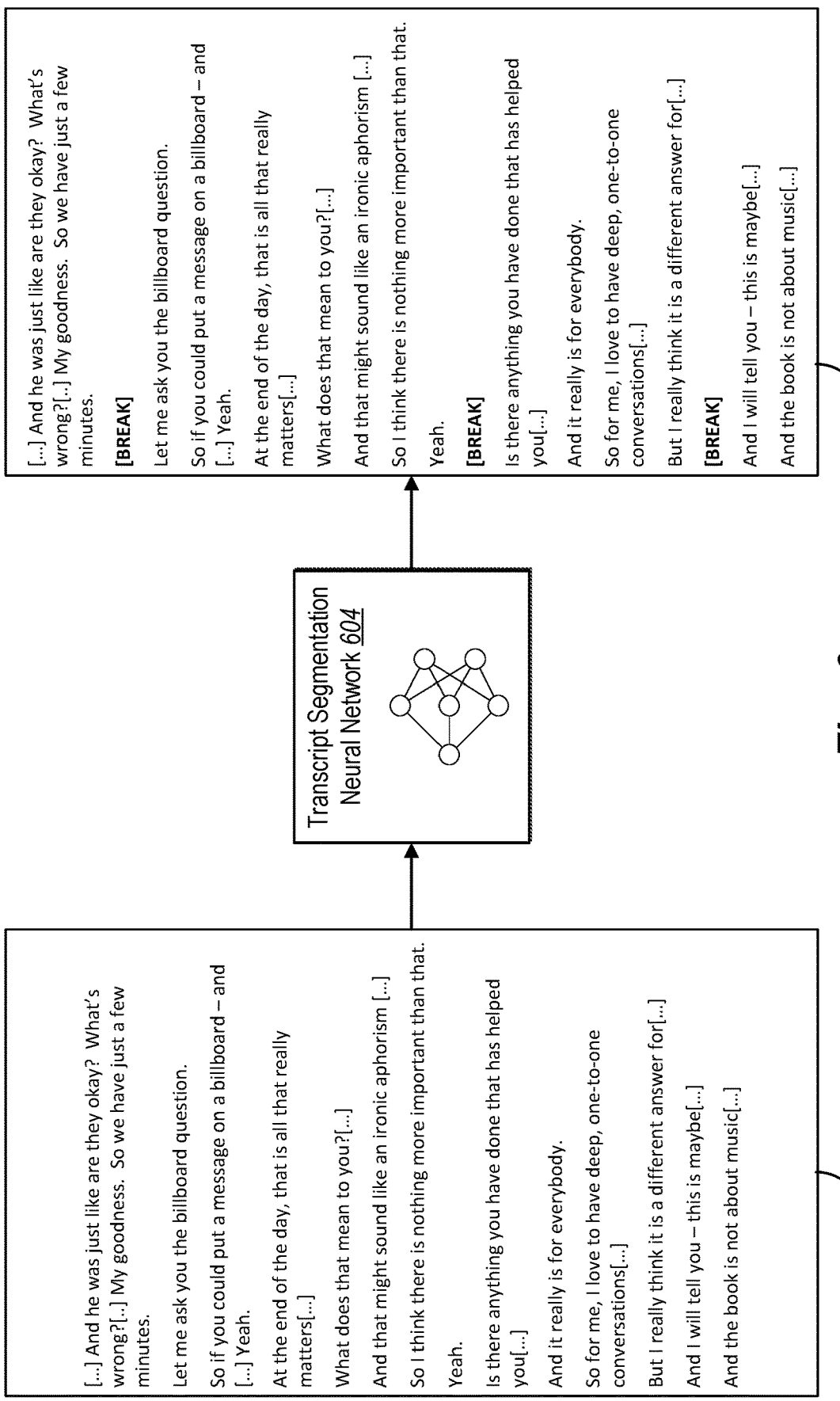
FIG. 6 illustrates an example of utilizing a trained transcript segmentation neural network to generate a segmented transcript from an audio recording transcript in accordance with one or more embodiments.

As previously mentioned, in some embodiments, the transcript segmentation system 102 uses a trained transcript segmentation neural network to generate segmented audio recording transcripts. In particular, the transcript segmentation system 102 uses a transcript segmentation neural network trained as described earlier to identify transcript segments from audio recording transcripts. FIG. 6 illustrates an example of utilizing a trained transcript segmentation neural network to generate a segmented transcript from an audio recording transcript in accordance with one or more embodiments.

In one or more embodiments, the transcript segmentation system 102 receives an audio recording transcript 602. For example, the transcript segmentation system 102 receives audio recording transcript 602 from a transcript system (e.g., transcript system 116) that provides audio recording transcripts to the transcript segmentation system 102 in order to generate a segmented audio recording transcript. In other embodiments, the transcript segmentation system 102 generates the audio recording transcript 602 by using a transcript generation model to transcribe an audio recording.

As illustrated in FIG. 6, the transcript segmentation system 102 provides the audio recording transcript 602 to a transcript segmentation neural network 604. In particular, the transcript segmentation system 102 uses a transcript segmentation neural network 604 t trained, as described above, to identify segmentation breaks in audio recording transcripts. For example, the transcript segmentation neural network 604 identifies points or locations in the audio recording transcript 602 for placing segmentation breaks that denote changes in sentiment or topic.

In one or more embodiments, the transcript segmentation system 102 identifies text segments in the audio recording transcript 602 and classifies the text segments according to adjacency. In particular, the transcript segmentation system 102 identifies a text segment by identifying portions of text on either side of a sentence component. For example, the transcript segmentation system 102 can identify a first text segment by identifying a set number of words or characters to the left of the sentence component and a second text segment by identifying a set number of words to the right of the sentence component. In another example, the transcript segmentation system 102 associates each word in the audio recording transcript with a token and identifies a first set of tokens to the left of the sentence component and a set of tokens to the right of the sentence component and where the first set of tokens and the second set of tokens have an equal number of tokens (T).

As mentioned, the transcript segmentation system 102 classifies text segments according to adjacency. In particular, the transcript segmentation system 102 uses the transcript segmentation neural network 604 to classify text segments as adjacent or not adjacent. For example, the transcript segmentation neural network 604 uses binary classification to classify text segments by outputting a "1" or a "no" if the text segments are adjacent (e.g., there should not be a segmentation break) and a "0" or a "yes" if the text segments are not adjacent (e.g., there should be a segmentation break).

Further, in some embodiments, the transcript segmentation system 102 generates transcript segments from the classified text segments. In particular, the transcript segmentation system 102 identifies instances where the transcript segmentation neural network 604 classified the text segments as not adjacent and generates transcript segments. For example, a transcript segment includes the portion of text in an audio recording transcript between transcript contexts classified as not adjacent (e.g., the text between a first pair on non-adjacent transcript contexts and a second pair of non-adjacent transcript contexts. In some cases, the transcript segmentation system 102 generates a transcript segment by inserting special characters or visual markers between non-adjacent text segments.

Moreover, in one or more embodiments, the transcript segmentation system 102 generates a segmented audio recording transcript 606 from the plurality of transcript segments. In particular, the transcript segmentation system 102 generates the segmented audio recording transcript 606 by labeling segmentation breaks in the audio recording transcript corresponding to the transcript segments. For example, as illustrated in FIG. 6, the transcript segmentation system 102 labels segmentation breaks in audio recording transcript that correspond to the plurality of transcript segments.

Figure 7:
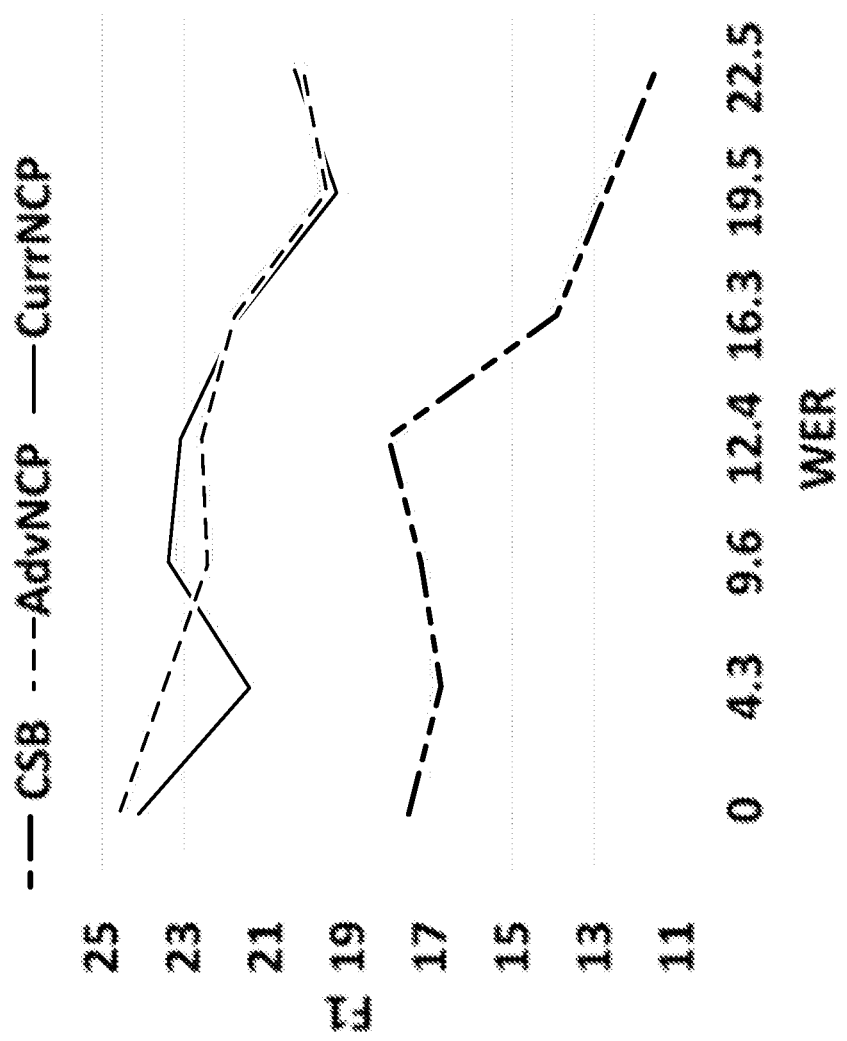
FIG. 7 illustrates a graph comparing transcription errors for different systems in accordance with one or more embodiments.

As mentioned, audio recording transcripts contain a multitude of errors and noise, such as from audio speech recognition used to generate audio recording transcripts. The transcript segmentation system 102, utilizing a trained transcript segmentation neural network, performs better than base neural network models. FIG. 7 illustrates a graph comparing transcription errors for the transcript segmentation system with those of other systems in accordance with one or more embodiments.

In some embodiments, the transcript segmentation system 102 introduces noise in order to demonstrate the robustness of the transcript segmentation neural network. The transcript segmentation system 102 can introduce noise in a variety of ways. For example, in some implementations, the transcript segmentation system 102 uses the methods of noise introduction as described by J. Wei and K. Zou in EDA: Easy Data Augmentation Techniques for Boosting Performance on Text Classification Tasks, Proceedings of the 2019 Conference on Empirical Methods in Natural Language Processing and the 9th International Joint Conference on Natural Language Processing (EMNLP-IJCNLP), 6382-6388 (2019), which is incorporated herein by reference in its entirety.

In one or more embodiments, the transcript segmentation system 102 introduces noise by operations that include random insertions, random swaps, and random deletions. Moreover, the transcript segmentation system 102 also uses a temperature variable to control how intensely the noise is applied. For example, by increasing the temperature in some of these operations, the transcript segmentation system 102 obtains audio recording transcripts with increasing word error rates (WER) with respect to the original audio recording transcripts.

As illustrated in FIG. 7, experimenters have demonstrated that the transcript segmentation system 102, utilizing the transcript segmentation neural network, is more robust to noise than other systems, producing more accurate results. For example, when compared to the base cross segment BERT (CSB) model, F1 scores are higher overall for multiple embodiments of the transcript segmentation system 102, such as those trained using advanced next conversation prediction ("AdvNCP") and those trained using curricular next conversation prediction ("CurrNCP"). Moreover, where F1 scores increasingly decrease as the WER increases in the base CSB model, F1 scores for transcript segmentation neural network drop only slightly as WER increases when the model is trained both with advanced next conversation prediction and curricular next conversation prediction.

As mentioned above, training the transcript segmentation neural network by using advanced next conversation prediction and curricular next conversation prediction results in increased accuracy over the previous systems. FIG. 8 illustrates example experimental results of a trained transcript segmentation neural network in accordance with one or more embodiments.

As illustrated in FIG. 8, experiments comparing the transcript segmentation neural network demonstrate an improvement in various accuracy measures compared to prior models, such as Sentence BERT (S-BERT) and CSB. For example, some experiments use an F1 score to evaluate the transcript segmentation neural network compared to S-BERT and CSB. As shown in FIG. 8, the transcript segmentation neural network trained using advanced next conversation prediction performs better than the CSB base model and remarkably better than the S-BERT. Moreover, as illustrated in FIG. 8, the transcript segmentation system trained using curricular next conversation prediction performs better than the transcript segmentation neural network trained using advanced next conversation prediction and remarkably better than CSB and S-BERT.

In another example, some experiments use a Pk score to evaluate the transcript segmentation neural network compared to S-BERT and CSB. A Pk score uses a sliding scale such that predicted segmentation breaks near the ground truth are penalized less than predicted segmentation breaks that are far away from the ground truth. A lower Pk score indicates a higher degree of accuracy. As illustrated in FIG. 8, when comparing Pk scores the transcript segmentation neural network trained using advanced next conversation prediction performs better than S-BERT and the CSB base model. Additionally, when comparing Pk scores, the transcript segmentation system trained using curricular next conversation prediction again performs better than the transcript segmentation neural network trained using advanced next conversation prediction, CSB, and S-BERT.

In a further example, some experiments use a WindowDiff (WDiff) score to evaluate the transcript segmentation neural network compared to S-BERT and CSB. Like Pk, WDiff score also uses a sliding scale. However, WDiff also accounts for the number of segment break predictions. As illustrated in FIG. 8, when comparing WDiff scores the transcript segmentation neural network trained using advanced next conversation prediction performs better than S-BERT and the CSB base model and the transcript segmentation neural network trained using advanced next conversation prediction. Additionally, when comparing WDiff scores, the transcript segmentation system trained using curricular next conversation prediction again performs better than S-BERT.

Figure 9:
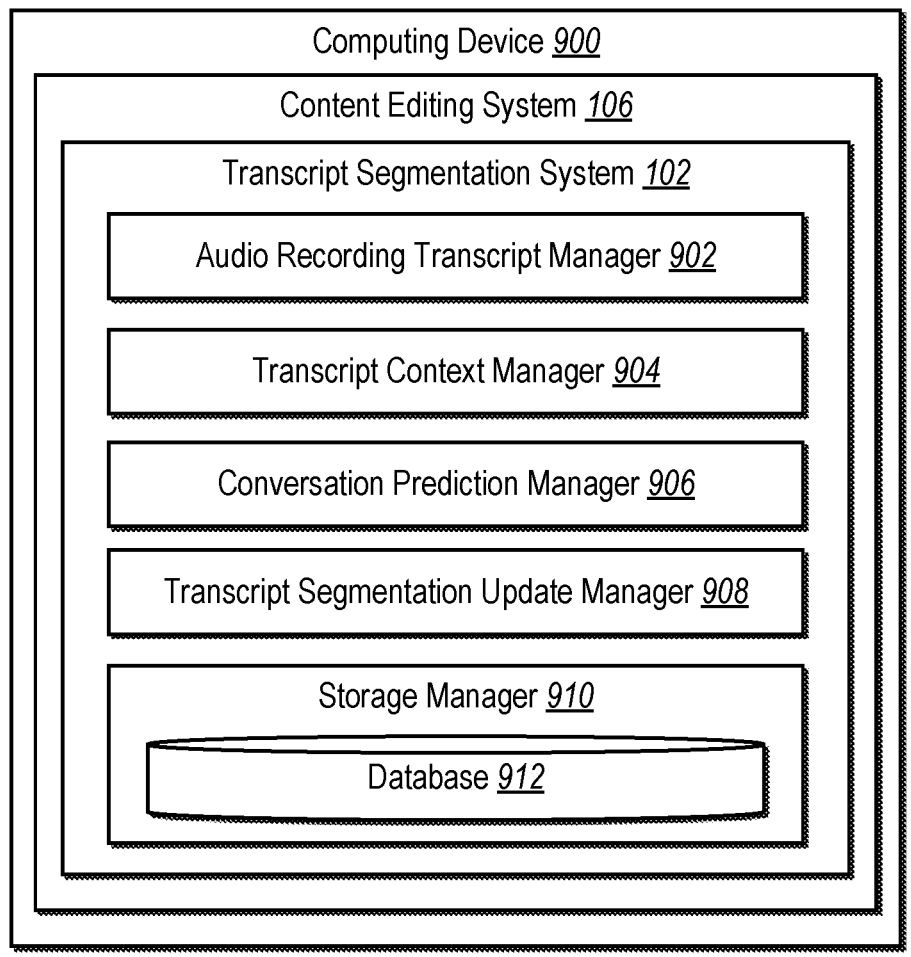
FIG. 9 illustrates a schematic diagram of a transcript segmentation system in accordance with one or more embodiments.

Looking now to FIG. 9, additional detail will be provided regarding components and capabilities of the transcript segmentation system 102. Specifically, FIG. 9 illustrates an example schematic diagram of the transcript segmentation system 102 on an example computing device 900 (e.g., one or more of the client device 112, the transcript system 116, and/or the server device(s) 104. In some embodiments, the computing device 900 refers to a distributed computing system where different managers are located on different devices, as described above. As shown in FIG. 9, the transcript segmentation system 102 includes an audio recording transcript manager 902, a transcript context manager 904, a conversation prediction manager 906, a transcript segmentation update manager 908, and a storage manager 910.

As just mentioned, the transcript segmentation system 102 includes an audio recording transcript manager 902. In particular, the audio recording transcript manager 902 manages, maintains, receives, or stores audio recording transcripts. For example, the audio recording transcript manager 902 provides audio recording transcripts to train a transcript segmentation neural network.

As shown, the transcript segmentation system 102 also includes a transcript context manager 904. In particular, the transcript context manager 904 manages, maintains, stores, access, provides, determines, generates, predicts, or identifies transcript contexts from an audio recording transcript. For example, the transcript context manager 904 determines a first transcript context and a second transcript context from an audio recording transcript. The transcript context manager 904 also determines a third transcript context and a fourth context from the audio recording context. In addition, the transcript context manager determines a similarity and/or a distance between transcript contexts.

As further illustrated in FIG. 9, the transcript segmentation system 102 includes a conversation prediction manager 906. In particular, the conversation prediction manager 906 manages, maintains, stores, access, provides, determines, generates, predicts, or identifies a conversation prediction for a sentence component. For example, the conversation prediction manager 906 determines a conversation prediction from a sentence component by comparing a first transcript context and a second transcript context.

Additionally, the transcript segmentation system 102 includes a transcript segmentation update manager 908. In particular, the transcript segmentation update manager 908 manages, maintains, updates, determines, learns, modifies, tunes, adjusts, generates, or recalibrates model parameters for a transcript segmentation neural network based on the conversation prediction. For example, the transcript segmentation update manager 908 uses the conversation prediction to modify model parameters based on comparing the conversation prediction to a segmentation label.

The transcript segmentation system 102 further includes a storage manager 910. The storage manager 910 operates in conjunction with, or includes, one or more memory devices such as the database 912 (e.g., the database 118) that store various data such as model parameters, model training data, audio recording transcript data, transcript context data, and conversation prediction data.

In one or more embodiments, each of the components of the transcript segmentation system 102 are in communication with one another using any suitable communication technologies. Additionally, the components of the transcript segmentation system 102 is in communication with one or more other devices including one or more client devices described above. It will be recognized that although the components of the transcript segmentation system 102 are shown to be separate in FIG. 9, any of the subcomponents may be combined into fewer components, such as into a single component, or divided into more components as may serve a particular implementation. Furthermore, although the components of FIG. 9 are described in connection with the transcript segmentation system 102, at least some of the components for performing operations in conjunction with the transcript segmentation system 102 described herein may be implemented on other devices within the environment.

The components of the transcript segmentation system 102, in one or more implementations, includes software, hardware, or both. For example, the components of the transcript segmentation system 102 include one or more instructions stored on a computer-readable storage medium and executable by processors of one or more computing devices (e.g., the computing device 900). When executed by the one or more processors, the computer-executable instructions of the transcript segmentation system 102 cause the computing device 900 to perform the methods described herein. Alternatively, the components of the transcript segmentation system 102 comprises hardware, such as a special purpose processing device to perform a certain function or group of functions. Additionally, or alternatively, the components of the transcript segmentation system 102 includes a combination of computer-executable instructions and hardware.

Furthermore, the components of the transcript segmentation system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the transcript segmentation system 102 may be implemented as part of a stand-alone application on a personal computing device or a mobile device. Alternatively, or additionally, the components of the transcript segmentation system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, ILLUSTRATOR®, and INDESIGN®. "ADOBE," "ADOBE EXPERIENCE MANAGER," "CREATIVE CLOUD," "ADOBE STOCK," "PHOTOSHOP," "ILLUSTRATOR," and "INDESIGN" are either registered trademarks or trademarks of Adobe Inc. in the United States and/or other countries.

FIGS. 1-9 the corresponding text, and the examples provide a number of different systems, methods, and non-transitory computer readable media for training a transcript segmentation system 102 to segment audio recording transcripts into semantically independent segments. In addition to the foregoing, embodiments are describable in terms of flowcharts comprising acts for accomplishing a particular result. For example, FIGS. 10-11 illustrate flowcharts of example sequences or series of acts in accordance with one or more embodiments.

Figure 10:
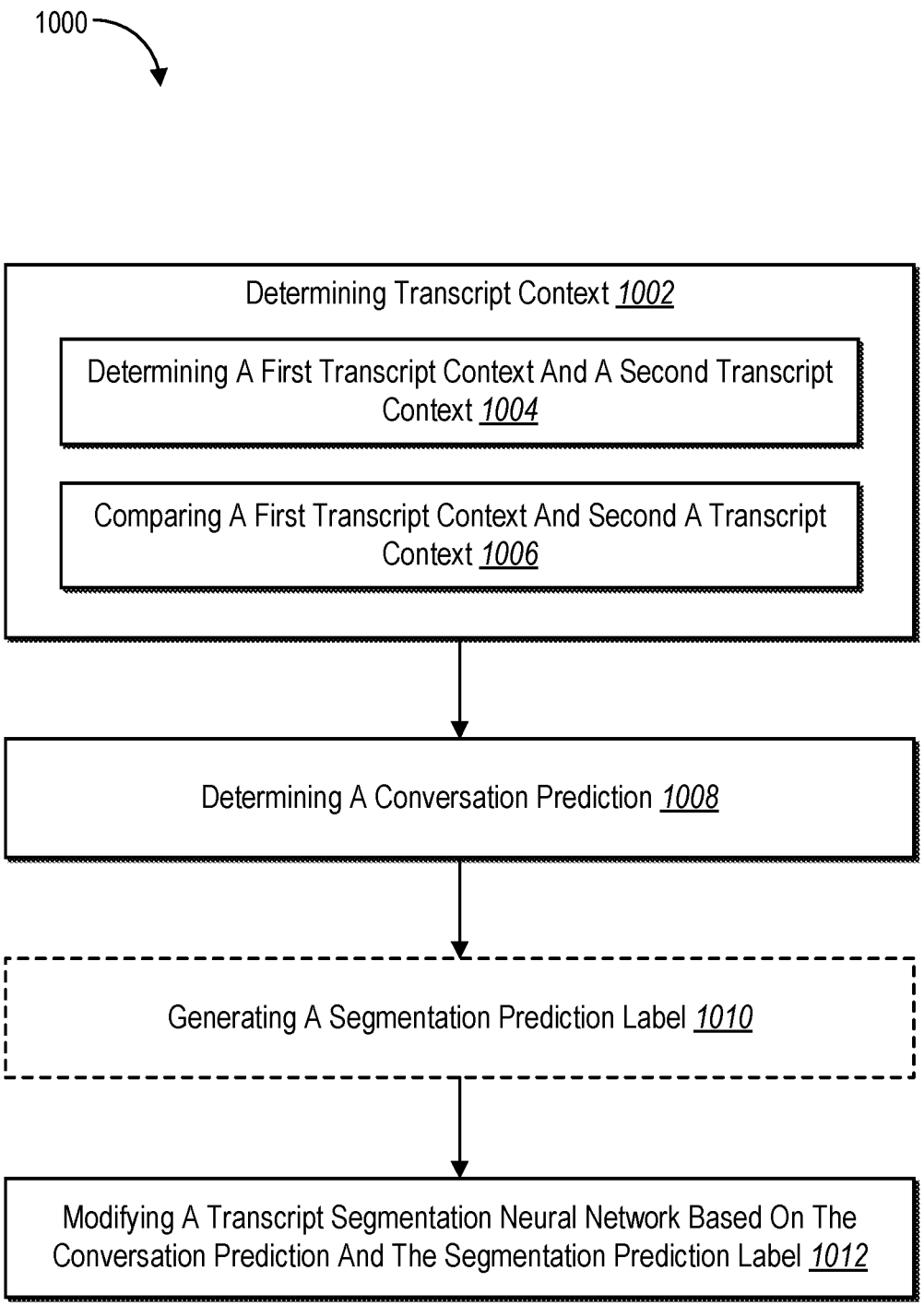
FIG. 10 illustrates a flowchart of a series of acts for determining a conversation prediction to use in training a transcript segmentation system in accordance with one or more embodiments.
Figure 11:
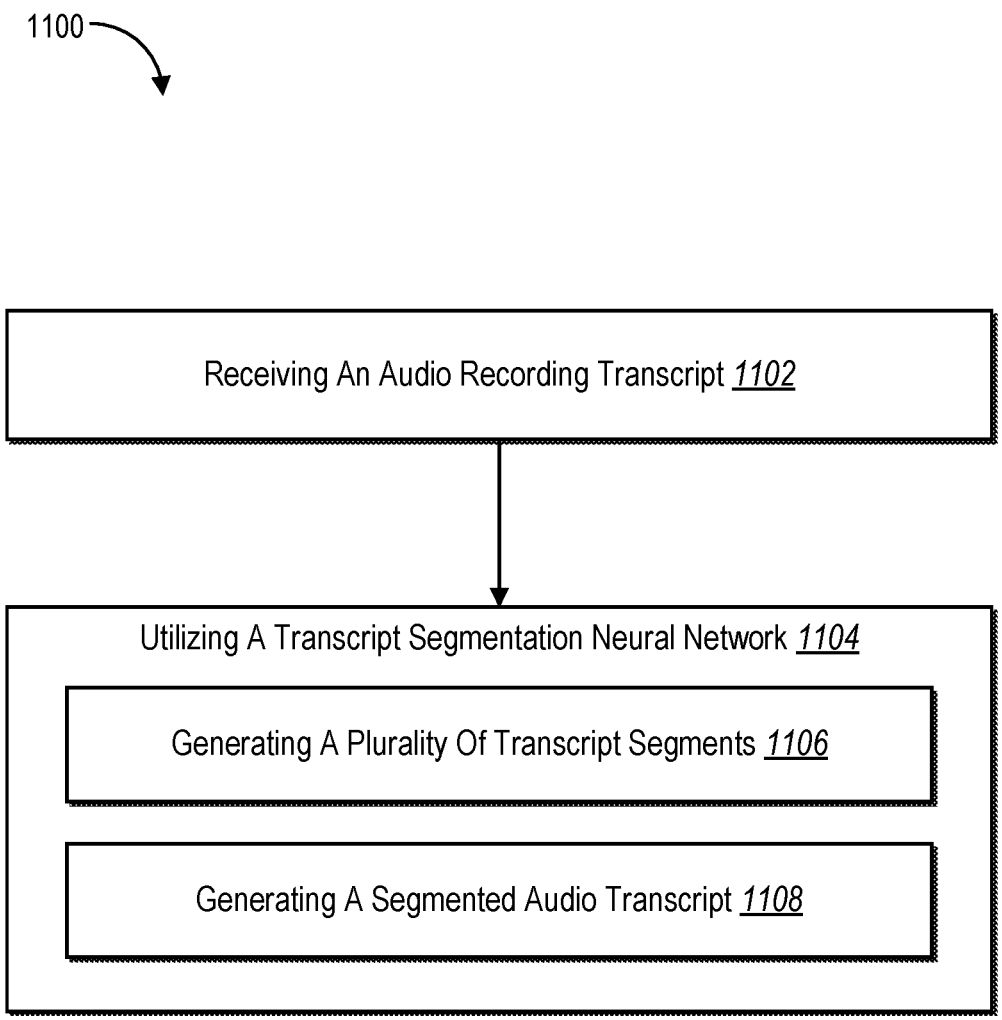
FIG. 11 illustrates a flowchart of a series of acts for generating a segmented audio transcript using a transcript segmentation neural network in accordance with one or more embodiments.

While FIGS. 10-11 illustrate acts according to particular embodiments, alternative embodiments may omit, add to, reorder, and/or modify any of the acts shown in FIGS. 10-11. The acts of FIGS. 10-11 are be performed as part of a method. Alternatively, a non-transitory computer readable medium comprises instructions, that when executed by one or more processors, cause a computing device to perform the acts of FIGS. 10-11. In still further embodiments, a system performs the acts of FIGS. 10-11. Additionally, the acts described herein may be repeated or performed in parallel with one another or in parallel with different instances of the same or other similar acts.

FIG. 10 illustrates an example series of acts 1000 for training a transcript segmentation neural network to segment audio recording transcripts into semantically independent segments in accordance with one or more embodiments. In particular, the series of acts 1000 includes an act 1002 of determining transcript context. Indeed, the act 1002 can include one or more constituent acts, such as an act 1004 of determining a first transcript context and a second transcript context and an act 1006 of comparing a first transcript context and a second transcript context. For example, in some cases the act 1004 includes determining, from an audio recording transcript, a first transcript context and a second transcript context. In one or more embodiments, the act 1004 involves determining a first set of sentence tokens left of the sentence component and determining a second set of sentence tokens right of the sentence component, wherein the second set of sentence tokens has a number of sentence tokens equal to the first set of sentence tokens.

In one or more embodiments, the act 1006 includes comparing the first transcript context and the second transcript context within the audio recording transcript. In other embodiments, the act 1004 involves determining whether the sentence component is adjacent to one or more of the first transcript context and the second transcript context based on one or more of a similarity or a distance between the first transcript context and the second transcript context. In one or more embodiments, the act 1006 involves determining a distance between the first transcript context and the second transcript context. Further, the act 1006 sometimes involves determining a number of sentences between the first transcript context and the second transcript context. In one or more instances, the act 1006 involves determining a similarity between the first transcript context and the second transcript context. Further, the act 1006 sometimes involves determining a semantic similarity between the first transcript context and the second transcript context.

In other embodiments, the act 1006 involves comparing a similarity between the first transcript context and the second transcript context and determining the conversation prediction comprises determining whether the sentence component is adjacent to one or more of the first transcript context and the second transcript context based on the similarity between the first transcript context and the second transcript context.

In some cases, the act 1006 includes determining a distance between the first transcript context and the second transcript context and determining the conversation prediction comprises determining whether the sentence component is adjacent to one or more of the first transcript context or the second transcript context based on the distance between the first transcript context and the second transcript context.

Additionally, as illustrated in FIG. 10, the series of acts 1000 includes an act 1008 of determining a conversation prediction. In particular, the act 1008 involves, based on comparing the first transcript context and the second transcript context, determining a conversation prediction for the sentence component. The act 1008 sometimes involves determining a conversation prediction for the sentence component based on comparing the first transcript context and the second transcript context within the audio recording transcript.

As further shown, in some embodiments, the series of acts 1000 includes an act 1010 of generating a segmentation prediction label. In particular, the act 1010 includes generating, utilizing a segmentation classification machine learning model, a segmentation prediction label for the sentence component.

The series of acts 1000 further includes comparing the conversation prediction to the segmentation prediction label associated with the sentence component, determining that the conversation prediction matches the segmentation prediction label based on the comparing the conversation prediction to the segmentation prediction label, and modifying the transcript segmentation neural network by modifying parameters of the transcript segmentation neural network based on determining that the conversation prediction matches the segmentation prediction label.

The series of acts 1000 further includes an act 1012 for modifying a transcript segmentation neural network. In particular, the act 1012 includes modifying a transcript segmentation neural network by updating parameters of the transcript segmentation neural network based on the conversation prediction.

In certain cases, the series of acts 1000 includes determining, from the audio recording transcript, a third transcript context and a fourth transcript context associated with an additional sentence component and determining an additional conversation prediction for the additional sentence component based on comparing the third transcript context and the fourth transcript context within the audio recording transcript, and generating, utilizing the segmentation classification machine learning model, an additional segmentation prediction label for the additional conversation prediction. Further, the series of acts 1000 includes comparing the conversation prediction to the segmentation prediction label associated with the sentence component to determine that the conversation prediction matches the segmentation prediction label, identifying the conversation prediction as a similar conversation prediction based on determining that the conversation prediction matches the segmentation prediction label, comparing the additional conversation prediction to an additional segmentation prediction label associated with the additional sentence component to determine that the additional conversation prediction does not match the additional segmentation prediction label, and identifying the additional conversation prediction as a dissimilar conversation prediction based on determining that the additional conversation prediction does not match the segmentation prediction label. Moreover, the series of acts 1000 includes modifying the parameters of the transcript segmentation neural network based on identifying the conversation prediction as a similar conversation prediction and modifying the parameters of the transcript segmentation neural network based on identifying the additional conversation prediction as a dissimilar conversation prediction.

FIG. 11 illustrates an example series of acts 1100 for generating a segmented audio transcript using a transcript segmentation neural network in accordance with one or more embodiments. In particular, the series of acts 1100 includes an act 1102 of receiving an audio recording transcript.

In some embodiments, the series of acts 1100 includes an act 1104 of utilizing a transcript segmentation neural network. Indeed, the act 1104 can include one or more constituent acts, such as act 1106 of generating a plurality of transcript segments and an act 1108 of generating a segmented audio transcript. For example, in some cases, the act 1106 includes generating, utilizing the transcript segmentation neural network, a plurality of transcript segments for the audio recording transcript by classifying text segments from the audio recording transcript according to segment adjacency. In certain embodiments, the act 1108 includes generating a segmented audio recording transcript from the plurality of transcript segments. In some embodiments, the series of acts 1100 also includes providing the segmented audio transcript for display on a client device.

In one or more embodiments, the series of acts 1100 includes that the transcript segmentation neural network is trained by determining a segment adjacency for a first transcript context and a second transcript context of the sentence component based on a similarity between the first transcript context and the second transcript context. In other cases, the transcript segmentation neural network is trained by determining a segment adjacency for the sentence component based on a distance between the first transcript context and the second transcript context. In some embodiments, the transcript segmentation neural network is trained by generating, utilizing a segmentation classification machine learning model, a segmentation prediction label for the sentence component and modifying parameters of the transcript segmentation neural network based on the segmentation prediction label.

Embodiments of the present disclosure may comprise or use a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) use transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
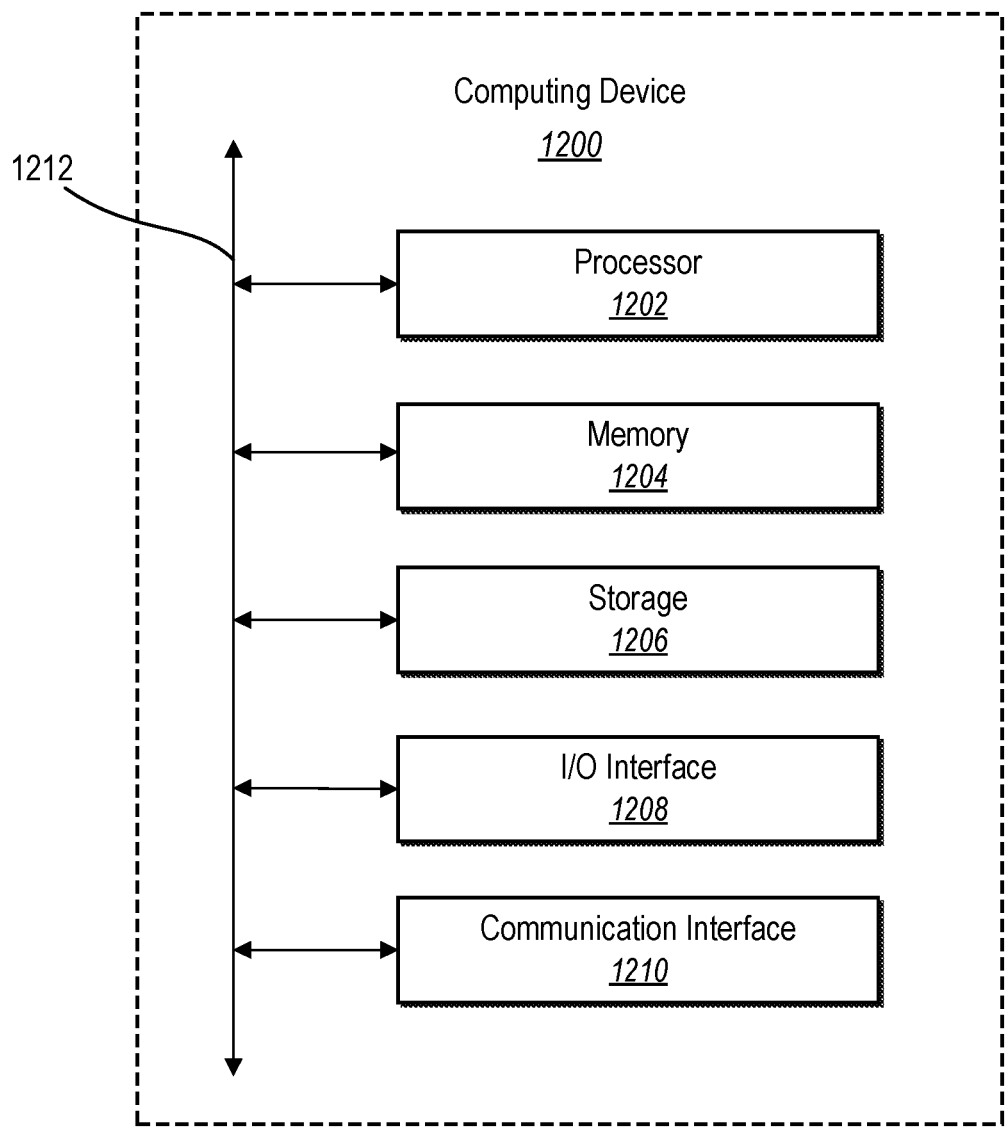
FIG. 12 illustrates a block diagram of an example computing device for implementing one or more embodiments of the present disclosure.

FIG. 12 illustrates a block diagram of an example computing device 1200 that may be configured to perform one or more of the processes described above. One will appreciate that one or more computing devices, such as the computing device 1200 may represent the computing devices described above (e.g., computing device 900, server device(s) 104, and/or client device 112). In one or more embodiments, the computing device 1200 may be a mobile device (e.g., a mobile telephone, a smartphone, a PDA, a tablet, a laptop, a camera, a tracker, a watch, a wearable device, etc.). In some embodiments, the computing device 1200 may be a non-mobile device (e.g., a desktop computer or another type of client device). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   determining, from an audio recording transcript, a first transcript context comprising a first set of sentence tokens associated with a sentence component and a second transcript context comprising a second set of sentence tokens associated with the sentence component;
   comparing the first transcript context and the second transcript context within the audio recording transcript;
   based on comparing the first transcript context and the second transcript context, determining a conversation prediction for the sentence component; and
   modifying a transcript segmentation neural network by updating parameters of the transcript segmentation neural network based on the conversation prediction.

2. The computer-implemented method of claim 1, wherein:
   determining the first transcript context comprising the first set of sentence tokens further comprises determining the first set of sentence tokens left of the sentence component; and
   determining the second transcript context comprising the second set of sentence tokens further comprises determining the second set of sentence tokens right of the sentence component, wherein the second set of sentence tokens has a number of sentence tokens equal to the first set of sentence tokens.

3. The computer-implemented method of claim 1, wherein determining the conversation prediction comprises determining whether the sentence component is adjacent to one or more of the first transcript context or the second transcript context based on one or more of a similarity or a distance between the first transcript context and the second transcript context.

4. The computer-implemented method of claim 1, wherein comparing the first transcript context and the second transcript context comprises determining a distance between the first transcript context and the second transcript context.

5. The computer-implemented method of claim 4, wherein determining the distance comprises determining a number of sentences between the first transcript context and the second transcript context.

6. The computer-implemented method of claim 1, wherein comparing the first transcript context and the second transcript context comprises determining a similarity between the first transcript context and the second transcript context.

7. The computer-implemented method of claim 6, wherein determining the similarity comprises determining a semantic similarity between the first transcript context and the second transcript context.

8. A non-transitory computer readable medium storing executable instructions which, when executed by a processing device, cause the processing device to perform operations comprising:
   determining, from an audio recording transcript, a first transcript context comprising a first set of sentence tokens associated with a sentence component and a second transcript context comprising a second set of sentence tokens associated with the sentence component;
   determining a conversation prediction for the sentence component based on comparing the first transcript context and the second transcript context within the audio recording transcript;
   generating, utilizing a segmentation classification machine learning model, a segmentation prediction label for the sentence component; and
   modifying a transcript segmentation neural network by updating parameters of the transcript segmentation neural network based on the segmentation prediction label and the conversation prediction.

9. The non-transitory computer readable medium of claim 8, wherein:
   determining the first transcript context comprising the first set of sentence tokens further comprises determining the first set of sentence tokens left of the sentence component; and
   determining the second transcript context comprising the second set of sentence tokens further comprises determining the second set of sentence tokens right of the sentence component, wherein the second set of sentence tokens has a number of sentence tokens equal to the first set of sentence tokens.

10. The non-transitory computer readable medium of claim 8, wherein:
    comparing the first transcript context and the second transcript context comprises comparing a similarity between the first transcript context and the second transcript context; and
    determining the conversation prediction comprises determining whether the sentence component is adjacent to one or more of the first transcript context or the second transcript context based on the similarity between the first transcript context and the second transcript context.

11. The non-transitory computer readable medium of claim 8, wherein:
    comparing the first transcript context and the second transcript context comprises determining a distance between the first transcript context and the second transcript context; and
    determining the conversation prediction comprises determining whether the sentence component is adjacent to one or more of the first transcript context or the second transcript context based on the distance between the first transcript context and the second transcript context.

12. The non-transitory computer readable medium of claim 8, further comprising:
    comparing the conversation prediction to the segmentation prediction label associated with the sentence component;
    determining that the conversation prediction matches the segmentation prediction label based on comparing the conversation prediction to the segmentation prediction label; and
    modifying the transcript segmentation neural network by modifying parameters of the transcript segmentation neural network based on determining that the conversation prediction matches the segmentation prediction label.

13. The non-transitory computer readable medium of claim 8, further comprising:

determining, from the audio recording transcript, a third transcript context and a fourth transcript context associated with an additional sentence component;

determining an additional conversation prediction for the additional sentence component based on comparing the third transcript context and the fourth transcript context within the audio recording transcript; and generating, utilizing the segmentation classification machine learning model, an additional segmentation prediction label for the additional conversation prediction.

14. The non-transitory computer readable medium of claim 13, further comprising:

comparing the conversation prediction to the segmentation prediction label associated with the sentence component to determine that the conversation prediction matches the segmentation prediction label;

identifying the conversation prediction as a similar conversation prediction based on determining that the conversation prediction matches the segmentation prediction label;

comparing the additional conversation prediction to an additional segmentation prediction label associated with the additional sentence component to determine that the additional conversation prediction does not match the additional segmentation prediction label; and identifying the additional conversation prediction as a dissimilar conversation prediction based on determining that the additional conversation prediction does not match the segmentation prediction label.

15. The non-transitory computer readable medium of claim 14, further comprising:

modifying the parameters of the transcript segmentation neural network based on identifying the conversation prediction as a similar conversation prediction; and modifying the parameters of the transcript segmentation neural network based on identifying the additional conversation prediction as a dissimilar conversation prediction.

16. A system comprising:

one or more memory devices comprising a transcript segmentation neural network trained to identify transcript segments from audio recording transcripts based on comparing transcript contexts comprising sets of tokens associated with a sentence component; and one or more processors configured to cause the system to:
receive an audio recording transcript comprising unstructured text;
generate, utilizing the transcript segmentation neural network, a plurality of transcript segments for the audio recording transcript by classifying text segments from the audio recording transcript according to segment adjacency; and
generate a segmented audio transcript from the plurality of transcript segments.

17. The system of claim 16, wherein the transcript segmentation neural network is trained by:

determining a segment adjacency for a first transcript context and a second transcript context of the sentence component based on a similarity between the first transcript context and the second transcript context.

18. The system of claim 17, wherein the transcript segmentation neural network is trained by:

determining a segment adjacency for the sentence component based on a distance between the first transcript context and the second transcript context.

19. The system of claim 16, wherein the transcript segmentation neural network is trained by:

generating, utilizing a segmentation classification machine learning model, a segmentation prediction label for the sentence component; and modifying parameters of the transcript segmentation neural network based on the segmentation prediction label.

20. The system of claim 19, further comprising providing the segmented audio transcript for display on a client device.

* * * * *